United States Patent
Shin et al.

(10) Patent No.: US 10,903,958 B2
(45) Date of Patent: Jan. 26, 2021

(54) METHOD AND APPARATUS FOR TRANSMITTING REFERENCE SIGNAL IN WIRELESS COMMUNICATION SYSTEM

(71) Applicant: Samsung Electronics Co., Ltd, Gyeonggi-do (KR)

(72) Inventors: Cheolkyu Shin, Suwon-si (KR); Hoondong Noh, Suwon-si (KR); Sangmin Ro, Seoul (KR); Younsun Kim, Seongnam-si (KR); Youngwoo Kwak, Suwon-si (KR); Youngbum Kim, Seoul (KR); Seunghoon Choi, Seongnam-si (KR); Donghan Kim, Osan-si (KR); Jinyoung Oh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/737,735

(22) PCT Filed: Jun. 17, 2016

(86) PCT No.: PCT/KR2016/006438
§ 371 (c)(1),
(2) Date: Dec. 18, 2017

(87) PCT Pub. No.: WO2016/204549
PCT Pub. Date: Dec. 22, 2016

(65) Prior Publication Data

US 2018/0183556 A1    Jun. 28, 2018

Related U.S. Application Data

(60) Provisional application No. 62/182,005, filed on Jun. 19, 2015, provisional application No. 62/185,244, filed on Jun. 26, 2015.

(51) Int. Cl.
*H04L 5/00* (2006.01)
*H04B 7/0456* (2017.01)
*H04W 84/04* (2009.01)

(52) U.S. Cl.
CPC .......... *H04L 5/0051* (2013.01); *H04B 7/0478* (2013.01); *H04L 5/00* (2013.01); *H04W 84/042* (2013.01)

(58) Field of Classification Search
CPC ....... H04L 5/0051; H04L 5/00; H04B 7/0478; H04W 84/042
See application file for complete search history.

(56) References Cited

U.S. PATENT DOCUMENTS

| | | |
|---|---|---|
| 9,716,539 B2 | 7/2017 | Kim et al. |
| 2011/0200137 A1 | 8/2011 | Han et al. |

(Continued)

FOREIGN PATENT DOCUMENTS

| | | |
|---|---|---|
| CN | 104995855 A | 10/2015 |
| CN | 107852219 A | 3/2018 |

(Continued)

OTHER PUBLICATIONS

Communication from a foreign patent office in a counterpart foreign application, European Patent Office, "Supplementary European Search Report," Application No. EP 16807881.4, dated Jun. 5, 2018, 8 pages.

(Continued)

*Primary Examiner* — Thai Nguyen

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication tech- (Continued)

nology and the IoT-related technology, such as smart home, smart building, smart city, smart car, connected car, health care, digital education, smart retail, security and safety services. The present invention relates to a method and an apparatus for transmitting a reference signal, the method of a terminal according to the present invention comprising: receiving, through a higher layer signaling, configuration information including first information indicating one of a first demodulation reference signal (DMRS)-related table and a second DMRS-related table; receiving control information including second information on DMRS information; analyzing, based on the second information, a DMRS-related table indicated by the first information; and receiving a DMRS based on the result of the analysis.

12 Claims, 31 Drawing Sheets

(56) References Cited

U.S. PATENT DOCUMENTS

| | | |
|---|---|---|
| 2012/0020272 A1 | 1/2012 | Lee et al. |
| 2012/0155414 A1 | 6/2012 | Noh et al. |
| 2013/0003788 A1 | 1/2013 | Marinier et al. |
| 2013/0100922 A1 | 4/2013 | Ahn et al. |
| 2013/0194931 A1 | 8/2013 | Lee et al. |
| 2013/0195034 A1* | 8/2013 | Noh .................. H04L 5/0053 370/329 |
| 2013/0301548 A1 | 11/2013 | Etemad et al. |
| 2013/0322376 A1 | 12/2013 | Marinier et al. |
| 2014/0092792 A1 | 4/2014 | Kim et al. |
| 2014/0133395 A1 | 5/2014 | Nam et al. |
| 2014/0192917 A1 | 7/2014 | Nam et al. |
| 2014/0198675 A1 | 7/2014 | He et al. |
| 2014/0233519 A1 | 8/2014 | Nagata et al. |
| 2014/0247759 A1 | 9/2014 | Zhang et al. |
| 2014/0307820 A1 | 10/2014 | Chen et al. |
| 2014/0362793 A1 | 12/2014 | Chai et al. |
| 2015/0004969 A1 | 1/2015 | Han et al. |
| 2015/0016369 A1 | 1/2015 | Park et al. |
| 2015/0043469 A1 | 2/2015 | Kim et al. |
| 2015/0055496 A1 | 2/2015 | Zhao et al. |
| 2015/0078271 A1 | 3/2015 | Kim et al. |
| 2015/0146542 A1 | 5/2015 | Xia et al. |
| 2015/0155992 A1 | 6/2015 | Kim et al. |
| 2015/0156753 A1 | 6/2015 | Shan et al. |
| 2015/0156763 A1 | 6/2015 | Seo et al. |
| 2015/0162966 A1 | 6/2015 | Kim et al. |
| 2015/0180625 A1* | 6/2015 | Park .................. H04W 72/04 370/329 |
| 2015/0215906 A1* | 7/2015 | Park .................. H04W 72/12 370/312 |
| 2015/0249511 A1 | 9/2015 | Chen et al. |
| 2015/0280801 A1 | 10/2015 | Xin et al. |
| 2015/0349867 A1 | 12/2015 | Guo et al. |
| 2016/0029238 A1 | 1/2016 | Chen et al. |
| 2016/0029396 A1 | 1/2016 | Feng et al. |
| 2016/0050007 A1 | 2/2016 | Lee et al. |
| 2016/0100384 A1 | 4/2016 | Etemad et al. |
| 2016/0227485 A1 | 8/2016 | Davydov et al. |
| 2016/0249337 A1 | 8/2016 | Liang et al. |
| 2017/0033912 A1 | 2/2017 | Onggosanusi et al. |
| 2017/0085355 A1 | 3/2017 | Hayashi et al. |
| 2017/0250781 A1 | 8/2017 | Golitschek Edler Von Elbwart et al. |
| 2017/0332368 A1 | 11/2017 | Einhaus et al. |
| 2018/0026684 A1* | 1/2018 | Wei .................. H04L 25/0242 370/329 |
| 2018/0123755 A1 | 5/2018 | Kim et al. |

FOREIGN PATENT DOCUMENTS

| | | |
|---|---|---|
| EP | 2869478 A1 | 5/2015 |
| EP | 2966931 A1 | 1/2016 |
| EP | 3125438 A1 | 2/2017 |
| KR | 10-2011-0095060 A | 8/2011 |
| KR | 10-2013-0084607 A | 7/2013 |
| KR | 10-2014-0121541 A | 10/2014 |
| KR | 10-2014-0144205 A | 12/2014 |
| KR | 10-2015-0023363 A | 3/2015 |
| KR | 10-2015-0079948 A | 7/2015 |
| WO | 2014/007512 A1 | 1/2014 |
| WO | 2014/010911 A1 | 1/2014 |
| WO | 2014/113087 A1 | 7/2014 |
| WO | 2014135100 A1 | 9/2014 |
| WO | 2014139303 A1 | 9/2014 |
| WO | 2014/166384 A1 | 10/2014 |

OTHER PUBLICATIONS

Alcatel-Lucent et al., "Considerations for DMRS Enhancement in 3D MIMO", 3GPP TSG RAN WG1 Meeting #81, May 25-29, 2015, Fukuoka, Japan, 4 pages, R1-152663.
3rd Generation Partnership Project; Technical Specification Group Radio Access Network; Evolved Universal Terrestrial Radio Access (E-UTRA); Multiplexing and channel coding (Release 12), 3GPP TS 36.212 v12.4.0, Mar. 2015, 94 pages.
International Search Report dated Sep. 23, 2016 in connection with International Patent Application No. PCT/KR2016/006438.
International Search Report dated Sep. 8, 2016 in connection with International Patent Application No. PCT/KR2016/006267, 3 pages.
Written Opinion of the International Searching Authority dated Sep. 8, 2016 in connection with International Patent Application No. PCT/KR2016/006267, 10 pages.
Office Action dated Dec. 20, 2019 in connection with U.S. Appl. No. 15/735,821, 6 pages.
Samsung, "BI and PMI reporting for class B", 3GPP TSG RAN WG1 Meeting #82bis, Oct. 5-9, 2015, R1-155505, 5 pages.
CATT, "Beam selection indicator on PUCCH for CSI reporting class B", 3GPP TSG RAN WG1 Meeting #82bis, Oct. 5-9, 2015, R1-155215, 3 pages.
Notice of Allowance dated Aug. 10, 2020 in connection with U.S. Appl. No. 15/735,821, 29 pages.

* cited by examiner

FIG. 10

```
1000
CSI-RS-Config-r10 ::=   SEQUENCE {
    csi-RS-r10          CHOICE {
        release         NULL,
        setup           SEQUENCE {
            antennaPortsCount-r10   ENUMERATED {an1, an2, an4, an8}, ~1001
            resourceConfig-r10      INTEGER (0..31),    ~1002
            subframeConfig-r10      INTEGER (0..154),   ~1003
            p-C-r10                 INTEGER (-8..15)    ~1004
        }                                       OPTIONAL,   -- Need ON
    zeroTxPowerCSI-RS-r10   ZeroTxPowerCSI-RS-Conf-r12  OPTIONAL    -- Need ON
}
```

FIG. 13

```
CSI-Process-r1x ::=    SEQUENCE {
    csi-ProcessID-r1x              INTEGER (1..maxCSI-Proc-r1x),          ~1301
    antennaPortsCountTotal-r1x     ENUMERATED {an1, an2, an4, an8, an12, an16}   ~1302
    csi-RS-ConfigNZPId-List-r1x    (SIZE (1..N)) OF CSI-RS-ConfigNZPId-r1x,     ~1303
    ...
}

CSI-RS-ConfigNZP-r1x ::=    SEQUENCE {
    csi-RS-ConfigNZPId-r1x         INTEGER (1..maxCSI-RS-NZP-r1x),
    antennaPortsCount-r1x          ENUMERATED {an1, an2, an4, an8},      ~1304
    ...
}
```

FIG. 14

```
CSI-Process-r1x ::=    SEQUENCE {
    csi-ProcessID-r1x              INTEGER (1..maxCSI-Proc-r1x),         ~1401
    antennaPortsCountTotal-r1x     ENUMERATED {an1, an2, an4, an8, an12, an16, ..., an64}   ~1402
    csi-RS-ConfigNZPId1-r1x        CSI-RS-ConfigNZPId-r1x,               ~1403
    csi-RS-ConfigNZPId2-r1x        CSI-RS-ConfigNZPId-r1x.
    ...
}

CSI-RS-ConfigNZP-r1x ::=   SEQUENCE {
    csi-RS-ConfigNZPId-r1x         INTEGER (1..maxCSI-RS-NZP-r1x),
    antennaPortsCount-r1x          ENUMERATED {an1, an2, an4, an8},      ~1404
    ...
}
```

FIG. 15

```
1500 ┌─ CSI-Process-r1x  ::=   SEQUENCE {
     │   csi-ProcessID-r1x                          INTEGER (1..maxCSI-Proc-r1x),          ─1501
     │   antennaPortsCountTotal-r1x                 ENUMERATED {an1, an2, an4, an8, an10, an12, an16}
     │   csi-RS-ConfigNZPId-List-r1x                (SIZE (1..N)) OF CSI-RS-ConfigNZPId-r1x,
     │   csi-IM-ConfigId-r1x                        CSI-IM-ConfigId-r1x,
     └─  p-C-AndCBSRList-r1xSEQUENCE (SIZE (1..2)) OF P-C-AndCBSR-r1x,   ─1503
        ...
     }

P-C-AndCBSR-r1x  ::= SEQUENCE {
        p-C-r1x,                                    INTEGER (-8..15),
        codebookSubsetRestriction-r1x               BIT STRING
    }

CSI-RS-ConfigNZP-r1x  ::=   SEQUENCE {
        csi-RS-ConfigNZPId-r1x                      INTEGER (1..maxCSI-RS-NZP-r1x),
        antennaPortsCount-r1x                       ENUMERATED {an1, an2, an4, an8},
        resourceConfig-r1x                          INTEGER (0..31),
        subframeConfig-r1x                          INTEGER (0..154)    [I_{CSI-RS}],
     ┌─ p-C-delta-r1x                               INTEGER [α..β}                             ─1504
     │  scramblingIdentity-r11                      INTEGER (0..503)    [n_{ID}],
     └─ qcl-CRS-Info-r11                            SEQUENCE {
        ...
        }
        ...
    }
                                                                            OPTIONAL   -- Need ON
                                                                            OPTIONAL   -- Need OR
```

FIG. 16

```
1600 ─── CSI-Process-r1x ::=     SEQUENCE {
         csi-ProcessID-r1x            INTEGER [1..maxCSI-Proc-r1x],        ─ 1601
         antennaPortsCountTotal-r1x   ENUMERATED {an1, an2, an4, an8, an10, an12, an16..., an64}
         csi-RS-ConfigNZPId1-r1x      CSI-RS-ConfigNZPId-r1x,
         csi-RS-ConfigNZPId2-r1x      CSI-RS-ConfigNZPId-r1x,
         csi-IM-ConfigId-r1x          CSI-IM-ConfigId-r1x,
         ...
         }

CSI-RS-ConfigNZP-r1x ::=  SEQUENCE {
         csi-RS-ConfigNZPId-r1x       INTEGER [1..maxCSI-RS-NZP-r1x],
         antennaPortsCount-r1x        ENUMERATED {an1, an2, an4, an8},
         resourceConfig-r1x           INTEGER [0..31],
         subframeConfig-r1x           INTEGER [0..154]  [I_{CSI-RS}],
         p-C-referenceFlag            ENUMERATED [true]                    ─ 1602
         p-C-r1x                      INTEGER [-8..15]                     ─ 1603
         scramblingIdentity-r11       INTEGER [0..503]  [n_{ID}],
         ...
         }
```

FIG. 17

```
CSI-Process-r11 ::=   SEQUENCE {                                              ~1700
    csi-ProcessID-r1x              INTEGER (1..maxCSI-Proc-r1x),              ~1701
    antennaPortsCountTotal-r1x     ENUMERATED {an1, an2, an4, an8, an10, an12, an16}
    csi-RS-ConfigNZPId1-r1x        CSI-RS-ConfigNZPId-r1x,                    ~1702
    csi-RS-ConfigNZPId2-r1x        CSI-RS-ConfigNZPId-r1x,                    ~1703
    csi-IM-ConfigId-r1x            CSI-IM-ConfigId-r1x,
    p-C-AndCBSRList-r1x SEQUENCE (SIZE (1..2)) OF P-C-AndCBSR-r1x,            ~1704
    p-C-delta-r1x                  INTEGER [α..β]                             ~1705
    ...
}

P-C-AndCBSR-r11 ::= SEQUENCE {
    p-C-r1x                        INTEGER (-8...15),
    codebookSubsetRestriction-r1x  BIT STRING
}

CSI-RS-ConfigNZP-r1x ::=   SEQUENCE {                                         ~1706
    csi-RS-ConfigNZPId-r1x         INTEGER (1..maxCSI-RS-NZP-r1x),
    antennaPortsCount-r1x          ENUMERATED {an1, an2, an4, an8},
    resourceConfig-r1x             INTEGER (0..31),
    subframeConfig-r1x             INTEGER (0..154)  [I$_{CSI-RS}$],
    scramblingIdentity-r11         INTEGER (0..503)  [n$_{ID}$],
    ...
}
```

METHOD AND APPARATUS FOR TRANSMITTING REFERENCE SIGNAL IN WIRELESS COMMUNICATION SYSTEM

CROSS-REFERENCE TO RELATED APPLICATION(S)

This application is a National Stage of International Application No. PCT/KR2016/006438 filed Jun. 17, 2016 which claims the benefit of United States Patent Application Nos. 62/182,005 filed Jun. 19, 2015 and 62/185,244 filed Jun. 26, 2015, the contents of which are incorporated herein by reference.

TECHNICAL FIELD

The present disclosure relates to a wireless communication system and, more particularly, to a method of transmitting a reference signal in a wireless communication system.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, in order to provide data services and multimedia services out of the provision of the initial service focused on voice, a current mobile communication system is developed into a high-quality wireless packet data communication system. To this end, several standardization organizations, such as 3GPP, 3GPP2 and JEFF, perform a $3^{rd}$ evolution mobile communication system standard to which a multiple access method using multi-carrier has been applied. Recently, various mobile communication standards, such as long term evolution (LTE) of 3GPP, ultra mobile broadband (UMB) of 3GPP2 and 802.16m of IEEE, have been developed to support high-speed and high-quality wireless packet data transmission services based on a multiple access method using multi-carrier.

The existing $3^{rd}$ evolution mobile communication systems, such as LTE, UMB and 802.16m, are based on multi-carrier and multiple access methods. In order to improve transmission efficiency, the existing $3^{rd}$ evolution mobile communication systems are characterized in that they adopt multiple input multiple output (MIMO, may be hereinafter interchangeably used with a multi-antenna) and use various technologies, such as beam-forming, an adaptive modulation and coding (AMC) method and a channel-sensitive scheduling method. In the various technologies, system capacity performance is improved by improving transmission efficiency through a method of focusing on transmission power of signals transmitted by several antennas, controlling the amount of transmitted data or selectively transmitting data to a user having good channel quality depending on channel quality. Such methods operate based on channel status information between an evolved Node B (eNB, a base station (BS)) and a user equipment (UE, a mobile station (MS)), and thus an eNB or a UE needs to measure the channel state between the eNB and the UE. In this case, a channel status information reference signal (CSI-RS) is used. An eNB means a downlink transmission and uplink reception device located in a specific location, and one eNB may perform transmission and reception for a plurality of cells. In one mobile communication system, a plurality of eNBs is geographically distributed, and each of the eNBs may perform transmission and reception for a plurality of cells.

Meanwhile, a demodulation reference signal (DMRS) is a reference signal transmitted for a specific UE, and is transmitted when data is transmitted to a corresponding UE. A DMRS may include a total of 8 DMRS ports. In this case, if an FD-MIMO system supports MU-MIMO using a larger number of orthogonal transport layers, there may be a problem in that the amount of DMRS information is increased because the number of transport layers is increased. In this case, the DMRS information may include an antenna port through which a DMRS is transmitted, a scrambling identity ($n_{SCID}$), and the number of layers. Accordingly, if the number of orthogonal transport layers for MU-MIMO support is to be increased, a method of indicating increased DMRS information through a DCI needs to be newly defined.

Furthermore, as described above, a CSI-RS may be used to measure the channel state between an eNB and a UE. Today an eNB may configure 8 CSI-RS resources in each cell. However, an eNB having many antennas needs to configure 8 or more reference signal resources and transmit them to a UE for the generation and report of CSI. There is a need for a method of configuring 8 or more reference signal resources.

Furthermore, an eNB may estimate an uplink channel state by receiving a sounding reference signal (SRS) from a UE. Furthermore, in a carrier aggregation (CA) situation, a UE may transmit SRSs through a maximum of 32 serving cells at the same time. However, the amount of power allocable to the SRS may be significantly reduced because power that may be transmitted by the UE is limited, and the accuracy of SRS-based channel estimation in the eNB may be reduced. Accordingly, there is a need for a method for a UE to transmit an SRS so that an eNB can maintain the accuracy of SRS-based channel estimation.

SUMMARY

The present disclosure has been made in order to solve the above problems occurring in the related art, and an object of the present disclosure is to provide a method of indicating corresponding DMRS information through a DCI if an FD-MIMO system supports MU-MIMO using a larger number of orthogonal transport layers.

Furthermore, the present disclosure provides a method for an eNB to transmit configuration information for a plurality of CSI-RSs to a UE in an FD-MIMO system.

Furthermore, the present disclosure provides the SRS transmission method of a UE and the reception method of an eNB so that SRS-based channel estimation accuracy in an eNB reception stage can be maintained in a situation in which transmission power of the UE has been limited.

A method of a user equipment of the present disclosure for solving the aforementioned problem includes the steps of receiving configuration information including first information indicating one of a first demodulation reference signal (DMRS)-related table and a second DMRS-related table through a higher layer signaling, receiving control information including second information for DMRS information, analyzing a DMRS-related table indicated by the first information based on the second information, and receiving a DMRS based on a result of the analysis.

Furthermore, a method of an evolved NodeB includes the steps of transmitting configuration information including first information indicating one of a first demodulation reference signal (DMRS)-related table and a second DMRS-related table through a higher layer signaling, transmitting control information including second information for DMRS information, and transmitting a DMRS based on the DMRS-related table indicated by the first information and the second information.

Furthermore, a user equipment of the present disclosure for solving the aforementioned problem includes a transceiver transmitting or receiving a signal to or from another network entity and a controller configured to receive configuration information including first information indicating one of a first demodulation reference signal (DMRS)-related table and a second DMRS-related table through a higher layer signaling, receive control information including second information for DMRS information, analyze a DMRS-related table indicated by the first information based on the second information, and receive a DMRS based on a result of the analysis.

Furthermore, an evolved NodeB of the present disclosure for solving the aforementioned problem includes a transceiver transmitting or receiving a signal to or from another network entity and a controller configured to transmit configuration information including first information indicating one of a first demodulation reference signal (DMRS)-related table and a second DMRS-related table through a higher layer signaling, transmit control information including second information for DMRS information, and transmit a DMRS based on the DMRS-related table indicated by the first information and the second information.

In accordance with the present disclosure, although the number of transport layers increases in an FD-MIMO system, the deterioration of system performance can be minimized and increased DMRS information can be included in a DCI and transmitted to a UE through a method proposed by the present disclosure.

Furthermore, in accordance with the present disclosure, a UE can effectively generate and report channel status information using a plurality of pieces of CSI-RS configuration information.

Furthermore, in accordance with the present disclosure, an eNB can effectively perform SRS-based channel estimation in a situation in which transmission power of a UE has been limited.

BRIEF DESCRIPTION OF THE DRAWINGS

FIG. 10 is a diagram showing a method of transmitting CSI-RS configuration information according to another embodiment of the present disclosure.
FIG. 13 is a diagram showing a method of configuring CSI-RS resources according to a sixth embodiment of the present disclosure.

FIG. 14 is a diagram showing another method of configuring CSI-RS resources according to the sixth embodiment of the present disclosure.

FIG. 15 is a diagram showing a method of configuring power information according to an eighth embodiment of the present disclosure.

FIG. 16 is a diagram showing a method of configuring power information according to a ninth embodiment of the present disclosure.

FIG. 17 is a diagram showing a method of configuring power information according to a tenth embodiment of the present disclosure.

DETAILED DESCRIPTION

Figure 1:
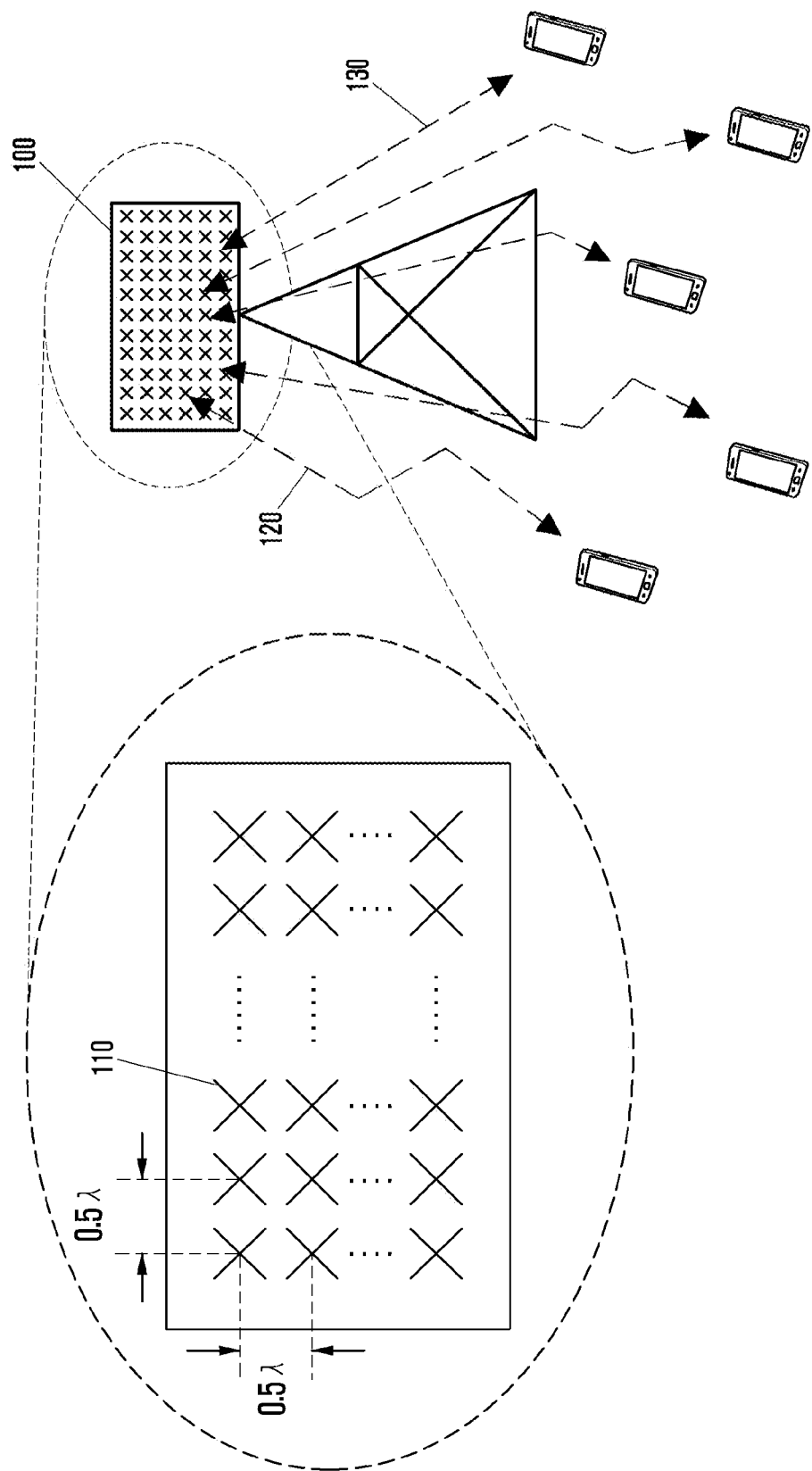
FIG. 1 is a diagram showing an FD-MIMO system.

Hereinafter, embodiments of the present disclosure are described in detail with reference to the accompanying drawings.

In describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

In this specification, in describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. The same reference numerals will be used to refer to the same or similar elements throughout the drawings.

In this case, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block or blocks. These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block or blocks. The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block or blocks.

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit" used in the present embodiment means, but is not limited to, a software or hardware component, such as a field programmable gate array (FPGA) or an application-specific integrated circuit (ASIC), which performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more CPUs within a device or a security multimedia card.

FIG. 1 is a diagram showing an FD-MIMO system.

The existing $3^{rd}$ generation and $4^{th}$ generation mobile communication system, such as LTE/LTE-A, may use the MIMO technology for transmission using a plurality of transmission/reception antennas in order to increase a data transfer rate and system capacity.

In the MIMO technology, a plurality of information streams may be spatially separated using a plurality of transmission/reception antennas and transmitted. As described above, a method of spatially separating and transmitting a plurality of information streams may be called a spatial multiplexing method. Whether spatial multiplexing can be applied to how many information streams may be different depending on the number of antennas of a transmitter and receiver. The number of information streams to which spatial multiplexing may be applied may be said to be a rank of corresponding transmission (hereinafter may be referred to as rank).

In the case of the MIMO technology supported by standards up to LTE/LTE-A Release 11, spatial multiplexing for a case where each of the number of transmission antennas and the number of reception antennas is 8 is supported. In this case, a maximum of 8 ranks may be supported. In contrast, an FD-MIMO system is evolved from the existing LTE/LTE-A MIMO technology and may use 32 or more transmission antennas.

The FD-MIMO system refers to a wireless communication system for transmitting data using several tens or more of transmission antennas. Referring to FIG. 1, an eNB transmission apparatus (or eNB) 100 includes several tens or more of transmission antennas and may transmit a radio signal. The plurality of transmission antennas 110 may be disposed to maintain the least distance. The least distance may be half (115) of the wavelength length of a transmitted radio signal, for example. If the distance, that is, half the wavelength length of a radio signal is maintained between transmission antenna, signals transmitted in the respective transmission antennas may be influenced by radio channels having a low correlation. For example, if the frequency band of a transmitted radio signal is 2 GHz, the distance between transmission antennas may be 7.5 cm. If the frequency band is higher than 2 GHz, the distance between transmission antennas may become shorter.

As in FIG. 1, several tens or more of the transmission antennas 110 disposed in the eNB 100 may be used to transmit signals 120 and 130 to one UE or a plurality of UEs. In this case, proper precoding may be applied to the signals transmitted by the plurality of transmission antennas 110, and the signals may be transmitted to the plurality of UEs at the same time.

Furthermore, one UE may receive one or more information streams. In general, the number of information streams that may be received by one UE may be determined depending on the number of reception antennas owned by the UE and a channel situation.

In order to effectively implement the FD-MIMO system, a UE has to accurately measure a channel situation and the size of interference and to transmit channel status information generated using the measured channel situation and size to an eNB. The eNB that has received the channel status information may determine that transmission will be performed on which UEs, that transmission will be performed at which data transfer rate, that which precoding will be applied using the channel status information.

However, in the case of the FD-MIMO system, if a conventional method of transmitting and receiving channel status information in an LTE/LTE-A system is applied, a lot of control information must be transmitted in the uplink because the number of transmission antennas is many. Accordingly, an uplink overhead problem may occur. In a mobile communication system, the time, frequency and power resources are limited. Accordingly, if more resources are allocated to a reference signal, resources which may be allocated to data traffic channel transmission are reduced, and thus the absolute amount of transmitted data may be reduced. In such a case, performance of channel measurement and estimation may be improved, but overall system capacity performance may be deteriorated because the absolute amount of transmitted data is reduced. Accordingly, a proper distribution is necessary between resources for a reference signal and resources for data transmission through a data traffic channel in order to achieve the best performance in terms of overall system performance.

Figure 2:
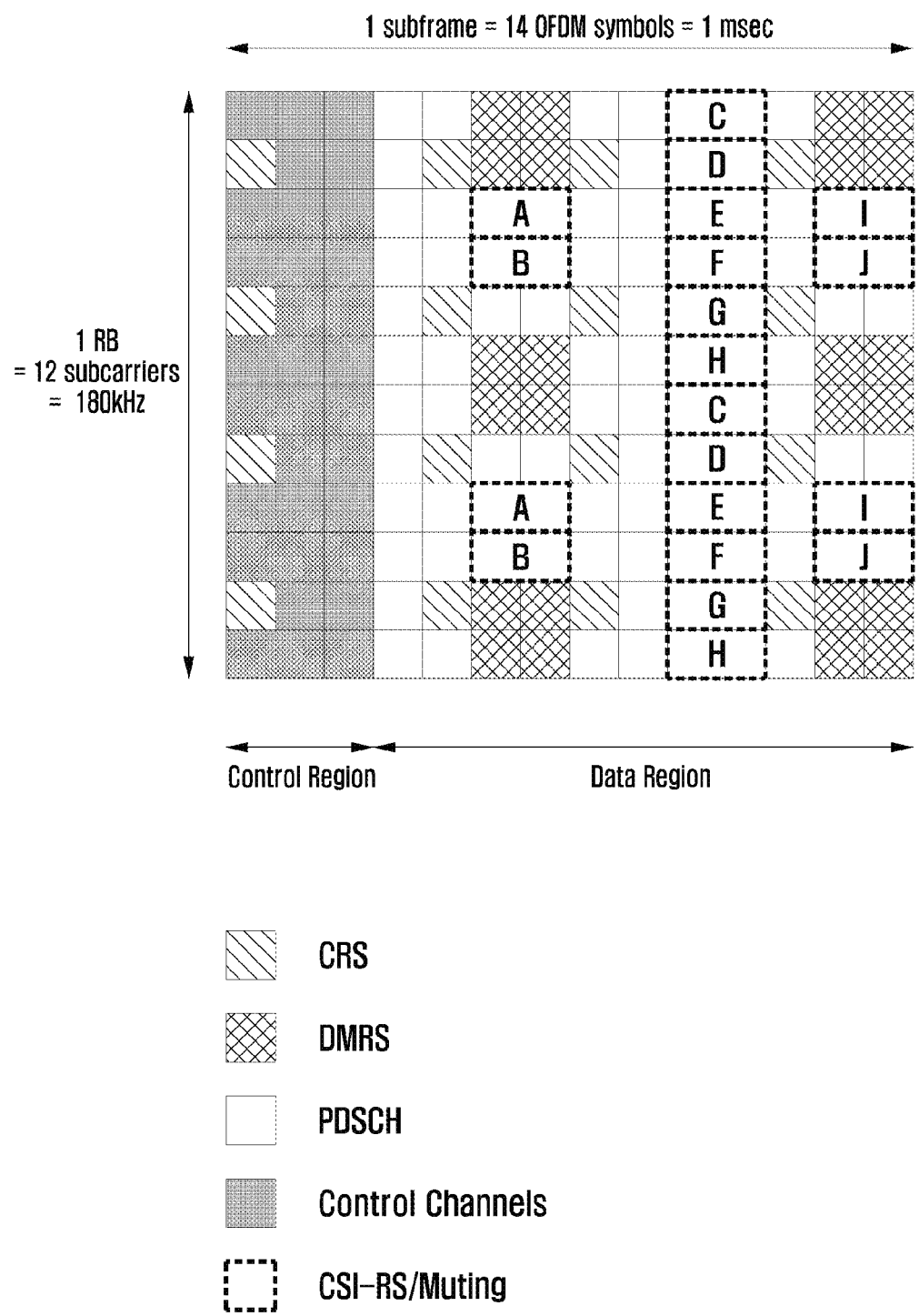
FIG. 2 is a diagram showing the configuration of a subframe.

FIG. 2 is a diagram showing the configuration of a subframe.

Radio resources shown in FIG. 2 may include one subframe in a time axis and one resource block (RB) in a frequency axis. Such radio resources include 12 subcarriers in a frequency domain and 14 orthogonal frequency division multiple access (OFDM) symbols in a time domain, and thus may include a total of 168 resource elements having unique frequency and time locations. In LTE/LTE-A, the resource element having a unique frequency and time location shown in FIG. 2 may be called a resource element (RE).

A plurality of different types of the following signals may be transmitted in the radio resources shown in FIG. 2.

1. A cell-specific reference signal (CRS): it is a reference signal periodically transmitted to all of UEs belonging to one cell and may be used by a plurality of UEs in common.

2. A DMRS: it is a reference signal transmitted for a specific UE and may be transmitted only when data is transmitted to a corresponding UE. A DMRS may include a total of 8 DMRS ports. In LTE/LTE-A, the 8 DMRS ports correspond to a port 7 to a port 14. The ports may maintain orthogonality so that interference is not generated between the ports using code divisional modulation (CDM) or frequency division multiplexing (FDM).

3. A physical downlink shared channel (PDSCH): it may mean a downlink channel used for an eNB to transmit traffic (or data) to a UE. An eNB may transmit data using an RE in which a reference signal is not transmitted in the data region (or PDSCH region) of FIG. 2.

4. A CSI-RS: it is a reference signal transmitted for UEs belonging to one cell and may be used to measure a channel state. Furthermore, a plurality of CSI-RSs may be transmitted in one cell.

5. Other control channels (a physical hybrid-ARQ indicator channel (PHICH), a physical control format indicator channel (PCFICH) and a physical downlink control channel (PDCCH)): An eNB may provide control information necessary for a UE to receive data through a PDSCH or may transmit ACK/NACK for the operation of an HARQ for uplink data transmission.

In addition to the signals, in an LTE-A system, an eNB may configure muting so that a CSI-RS transmitted by another eNB can be received by UEs of a corresponding cell without interference. The muting may be applied in a location where a CSI-RS may be transmitted. In general, a UE may skip a corresponding radio resource and receive a traffic signal. In an LTE-A system, muting is also called a zero-power CSI-RS as another term. The reason for this is that muting is applied to the location of a CSI-RS and transmission power is not transmitted in the location from the nature of muting. Hereinafter, not-muted CSI-RS configuration information may be called NZP CSI-RS configuration information, and muted CSI-RS configuration information may be called ZP CSI-RS configuration information.

In FIG. 2, a CSI-RS may be transmitted using some of locations indicated by A, B, C, D, E, E, F, G, H, I and J depending on the number of antennas in which the CSI-RS is transmitted. Furthermore, muting may also be applied to some of the locations indicated by A, B, C, D, E, E, F, G, H, I and J.

In particular, a CSI-RS may be transmitted through 2, 4 or 8 REs depending on the number of transmitted antenna ports. If the number of antenna ports is 2, a CSI-RS may be transmitted in half of a specific pattern in FIG. 2. If the number of antenna ports is 4, a CSI-RS may be transmitted in the entire specific pattern. If the number of antenna ports is 8, a CSI-RS may be transmitted using two patterns.

In contrast, muting is always performed in one pattern unit. That is, muting may be applied to a plurality of patterns, but cannot be applied to only part of one pattern if the location of the muting does not overlap a CSI-RS. However, muting may be applied to only part of one pattern only if the location of a CSI-RS and the location of muting overlap.

If a CSI-RS for two antenna ports is transmitted, an eNB may transmit the signal of each antenna port in two REs connected in the time axis, and the signals of antenna ports may be distinguished through orthogonal code. Furthermore, if a CSI-RS for four antenna ports is transmitted, signals for two additional antenna ports may be transmitted using two REs in addition to a CSI-RS for the two antenna ports. The same method may be used for a case where a CSI-RS for 8 antenna ports is transmitted.

As described above, a DMRS is a reference signal transmitted for a specific UE and may be transmitted only when data is transmitted to a corresponding UE. A DMRS may include a total of 8 DMRS ports. In LTE/LTE-A, the 8 DMRS ports correspond to a port 7 to a port 14. The ports may maintain orthogonality so that interference is not generated using CDM or FDM. This is described in more detail. A reference signal sequence for a DMRS may be represented as in Equation 1 below.

$$r(m) = \frac{1}{\sqrt{2}}(1 - 2 \cdot c(2m)) + j\frac{1}{\sqrt{2}}(1 - 2 \cdot c(2m + 1)), \quad \text{[Equation 1]}$$

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In this case, c(i) is a pseudo-random sequence, and an initial state (or initial value) for generating the scrambling sequence of a DMRS may be generated every subframe through Equation 2 below.

$$c_{init} = (\lfloor n_s/2 \rfloor + 1) \cdot (2n_{ID}^{(nSCID)} + 1) \cdot 2^{16} + n_{SCID} \quad \text{[Equation 2]}$$

In this case, $n_s$ is the slot index of a frame and may have an integer value between 0 and 19. In Equation 2, $n_{ID}^{(nSCID)}$ and $n_{SCID}$ are values related to the scrambling of a DMRS. $n_{ID}^{(nSCID)}$ corresponds to a virtual Cell ID value and may have an integer value between 0 and 503. Furthermore, $n_{SCID}$ corresponds to a scrambling ID value and may have a value of 0 or 1. In general, in LTE/LTE-A, the $n_{ID}^{(nSCID)}$ value may be determined to be any one of two $n_{ID}^{(nSCID)}$ values depending on an $n_{SCID}$ value. In this case, the two $n_{ID}^{(nSCID)}$ values may be set through high signaling. That is, as in Table 1, if the $n_{SCID}$ value is 0, a virtual Cell ID value has a value of scramblingIdentity-r11 preset through high signaling. If the $n_{SCID}$ value is 1, a virtual Cell ID value has a value of scramblingIdentity2-r11 preset through high signaling.

TABLE 1

DMRS-Config configuration field

```
-- ASN1START
DMRS-Config-r11 ::=          CHOICE {
    release                      NULL,
    setup                        SEQUENCE {
        scramblingIdentity-r11      INTEGER (0..503),
        saramblingIdentity2-r11     INTEGER (0..503)
    }
}
-- ASN1STOP
```

A reference signal sequence r(m) for the DMRS of Equation 1 is mapped to an RE through Equation 3 when a PDSCH is allocated to $n_{PRB}$ with respect to an antenna port p=7, p=8 or p='7, 8, . . . v+6.

$$a_{k,l}^{(p)} = w_p(l') \cdot r(3 \cdot l' \cdot N_{RB}^{max,DL} + 3 \cdot n_{PRB} + m') \quad \text{[Equation 3]}$$

wherein $$w_p(l') = \begin{cases} \overline{w_p(i)} & (m' + n_{PRB}) \bmod 2 = 0 \\ w_p(3 - i) & (m' + n_{PRB}) \bmod 2 = 1 \end{cases}$$

$$K = 5m' + N_{SC}^{RB} n_{PRB} + k'$$

$$K' = \begin{cases} 1 & p \in \{7, 8, 11, 13\} \\ 0 & p \in \{9, 10, 12, 14\} \end{cases}$$

-continued $$l = \begin{cases} l' \bmod 2 + 2 & \text{if in a special subframe with configuraiton 3, 4, 8 or 9 (see Table 4.2-1)} \\ l' \bmod 2 + 2 + 3\lfloor l'/2 \rfloor & \text{if in a special subframe with configuraiton 1, 2, 6 or 7 (see Table 4.2-1)} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuraiton 1, 2, 6, or 7 (see Table 4.2-1)} \\ 0, 1 & \text{if } n_s \bmod 2 = 0 \text{ and not in a special subframe with configuraiton 1, 2, 6, or 7 (see Table 4.2-1)} \\ 2, 3 & \text{if } n_s \bmod 2 = 1 \text{ and not in a special subframe with configuraiton 1, 2, 6, or 7 (see Table 4.2-1)} \end{cases}$$

$$m' = 0, 1, 2$$

Furthermore, $w_p(i)$ is given in Table 2. In the above equation, for Table 4.2-1, reference is made to LTE standard document 3GPP TS 36.211.

TABLE 2

The sequence $w_p(i)$ for normal cyclic prefix.

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

In Table 2, the sequence $w_p(i)$ is orthogonal cover code (OCC) for maintaining orthogonality between DMRS ports through CDM.

If MU-MIMO is supported, in a conventional technology, a maximum of up to 2 orthogonal transport layers are supported using 12 DMRS Res per PRB and OCC of a length 2 by taking into consideration only the antenna port p=7,8. Furthermore, a maximum of 4 quasi-orthogonal transport layers are supported using the $n_{SCID}$ value.

An eNB may indicate an antenna port in which a DMRS is transmitted, a scrambling identity ($n_{SCID}$), and the number of layers according to Table 3 using a DMRS information indicator of 3 bits in the DCI formats 2C and 2D.

TABLE 3

Antenna port(s), scrambling identity and number of layers indication

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 3 layers, ports 7-9 |
| 3 | 1 layer, port 8, $n_{SCID} = 1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In Table 3, the first column may correspond to a case where a PDSCH is scheduled as one codeword transmission, and the second column corresponds to a case where a PDSCH is scheduled as two codeword transmissions. Furthermore, in the first column, a value=4, 5, 6 may be used as the retransmission of a corresponding codeword. Furthermore, parts indicated by the values 0 to 3 of the first column (one codeword) and the values 0 and 1 of the second column (two codewords) may be used to indicate DMRS information upon performing the MU-MIMO transmission.

Referring to Table 3, in the current LTE standard, upon performing the MU-MIMO transmission, up to two orthogonal transport layers can be supported, and a maximum of 4 quasi-orthogonal transport layers can be supported using the scrambling identity ($n_{SCID}$).

Recently, however, in the FD-MIMO system, in order to increase the number of orthogonal transport layers for MU-MIMO support, DMRS enhancement is being discussed. Three alternatives for the DMRS enhancement are shown.

A first alternative (Alt-1): 12 DMRS REs with OCC=4 for up to a total of 4 layers per scrambling sequence A second alternative (Alt-2): 24 DMRS REs with OCC=2 for up to a total of 4 layers per scrambling sequence A third alternative (Alt-3): 24 DMRS REs with OCC=4 for up to a total of 8 layers per scrambling sequence As described above, in the LTE standard, if Table 3 is defined in the DCI formats 2C and 2D and MU-MIMO is supported, a maximum of up to two orthogonal transport layers are supported using 12 DMRS REs per PRB and OCC of a length 2 by taking into consideration only the antenna port p=7,8 and a maximum of up to four quasi-orthogonal transport layers are supported using the scrambling identity ($n_{SCID}$) value.

If the number of orthogonal transport layers for supporting MU-MIMO is increased, however, there may be a problem in that the amount of DMRS information that must be included is increased compared to the existing technology. In this case, the DMRS information may include an antenna port in which a DMRS is transmitted, a scrambling identity ($n_{SCID}$) and the number of layers. Accordingly, if the number of orthogonal transport layers for MU-MIMO support is increased, a method of indicating increased DMRS information through DCI needs to be newly defined.

The present disclosure proposes various methods of indicating increased DMRS information through DCI in order to solve the problem.

First, a method of increasing the number of bits and indicating increased DMRS information may be taken into consideration. However, to increase the number of bits of information included in DCI (a DMRS information indicator) so as to indicate increased DMRS information may result in the deterioration of system performance. Accordingly, there is a need for a method of indicating DMRS information as the amount of 3-bit information as in the existing technology.

In order to maintain the amount of 3-bit information as in the existing technology while indicating increased DMRS information, a method of not using at least one of the three pieces of information or transmitting the information through a higher layer signal may be taken into consideration. Furthermore, a method of separately defining DCI for MU-MIMO may be taken into consideration.

A method of indicating increased DMRS information with respect to the aforementioned three alternatives if the number of orthogonal transport layers for MU-MIMO is increased is described below.

Figure 3:
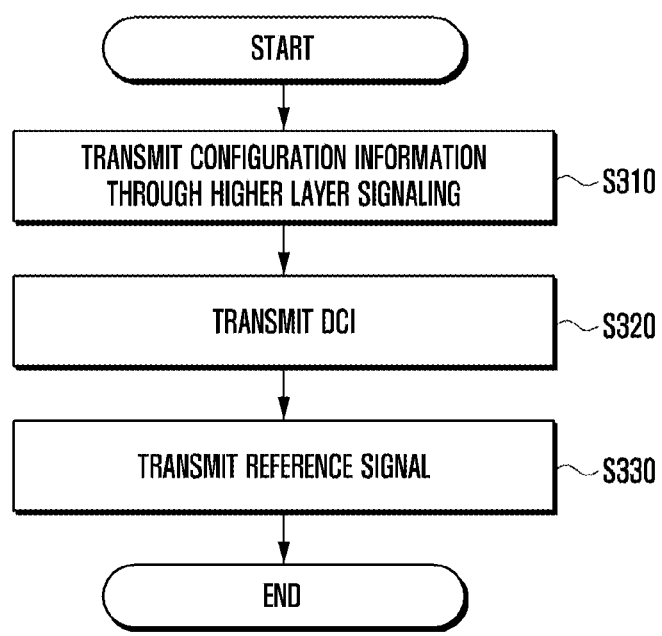
FIG. 3 is a diagram showing a process for an eNB to transmit a reference signal according to an embodiment of the present disclosure.

FIG. 3 is a diagram showing a process for an eNB to transmit a reference signal according to an embodiment of the present disclosure.

Referring to FIG. 3, the eNB of the present disclosure may transmit configuration information to a UE through higher layer signaling (e.g., RRC signaling) at step S310.

The configuration information may include DMRS information. The DMRS information may include at least one of antenna port-related information, a scrambling identity, and information related to the number of layers. Furthermore, if the number of DMRS-related tables stored in the eNB and the UE is two or more, the eNB may transmit an indicator indicative of a DMRS-related table (hereinafter a DMRS-related table indicator) to be used by the UE to the UE. Specifically, in the present disclosure, the eNB may configure a plurality of tables through RRC in order to support an increased MU orthogonal port, and may notify the UE that the UE will use which table through a DMRS-related table indicator. In this case, the indicator may be included in DMRS information and may be transmitted as separate information.

Meanwhile, configuration information transmitted through higher layer signaling may not include DMRS information and may include only a DMRS-related table indicator.

The eNB that has transmitted the DMRS information may transmit downlink control information (DCI) (or may be interchangeably used with a term called a downlink control message) at step S320.

The DCI may include a DMRS information indicator. If the configuration information includes at least one of antenna port-related information, a scrambling identity and information related to the number of layers. The DCI may include an indicator indicative of DMRS information other than information included in the configuration information.

In contrast, if the configuration information does not include DMRS information, DCI may include an indicator indicative of DMRS information, including antenna port-related information, a scrambling identity and the number of layers.

The DMRS information indicator may have a predetermined number of bits. For example, the DMRS information may have 3 bits or 4 bits. The eNB may indicate DMRS information (antenna port information, a scrambling identity and the number of layers) using a DMRS-related table and a DMRS information indicator, and detailed contents thereof are described later.

The eNB that has transmitted the DCI may transmit a reference signal at step S330. That is, the eNB may transmit a DMRS signal to the UE using the antenna port information, the scrambling identity and the number of layers.

Figure 4:
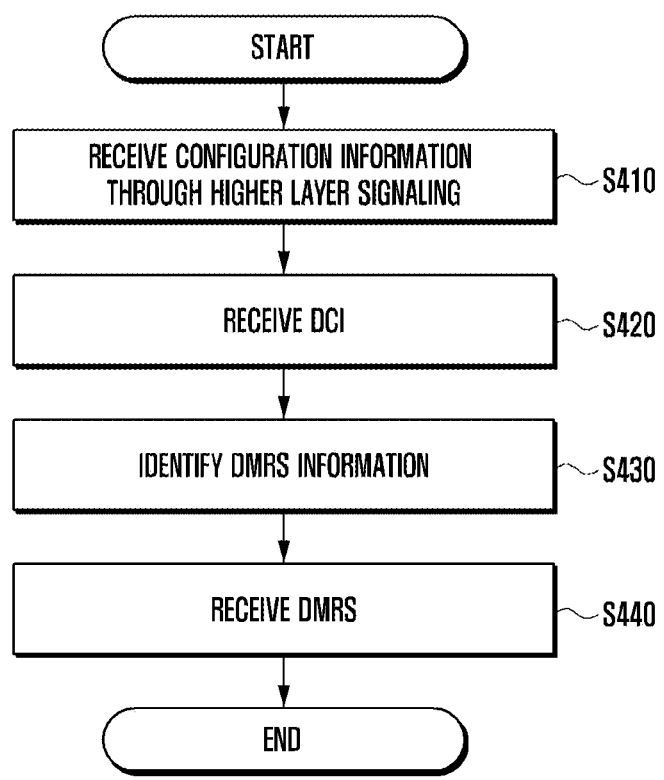
FIG. 4 is a diagram showing a process for a UE to receive a reference signal according to an embodiment of the present disclosure.

FIG. 4 is a diagram showing a process for a UE to receive a reference signal according to an embodiment of the present disclosure.

Referring to FIG. 4, the UE of the present disclosure may receive configuration information through higher layer signaling (e.g., RRC signaling) at step S410.

The configuration information may include DMRS information. The DMRS information may include at least one of antenna port-related information, a scrambling identity and information related to the number of layers. Furthermore, if the number of DMRS-related tables stored in an eNB and the UE is two or more, the UE may receive an indicator indicative of a DMRS-related table to be used (hereinafter a DMRS-related table indicator). Specifically, in the present disclosure, an eNB may configure a plurality of tables through RRC in order to support increased multi-user (MU) orthogonal ports, and may notify a UE that the UE will use which table through a DMRS-related table indicator. The UE may receive the DMRS-related table indicator through RRC.

In this case, the indicator may be included in DMRS information or may be transmitted as separate information.

Meanwhile, the configuration information may not include DMRS information and may include only a DMRS-related table indicator.

The UE that has received the DMRS information may receive DCI at step S420.

The DCI may include a DMRS information indicator. If the configuration information includes at least one of antenna port-related information, a scrambling identity and information related to the number of layers, the DCI may include an indicator indicative of DMRS information other than information included in configuration information.

In contrast, if the configuration information does not include DMRS information, the DCI may include an indicator indicative of DMRS information including antenna port-related information, a scrambling identity and the number of layers.

The DMRS information indicator may have a predetermined number of bits. For example, the DMRS information may have 3 bits or 4 bits.

At step S430, the UE that has received the DCI may analyze a DMRS-related table that has been previously stored or received from the eNB using the DMRS information indicator, and may seen DMRS information as a result of the analysis. That is, the UE may identify the DMRS information indicated by the DMRS information indicator in the DMRS-related table.

If the number of DMRS-related table previously stored or received from the eNB is two or more, the UE may determine a DMRS-related table based on the configuration information received from the eNB. Furthermore, the UE may identify DMRS information using the determined DMRS-related table and the DMRS information indicator. That is, the UE may identify DMRS information indicated by a DMRS information indicator in the determined DMRS-related table.

Furthermore, the UE may receive a DMRS based on the identified DMRS information at step S440.

Furthermore, if configuration information received through higher layer signaling includes at least one of pieces of DMRS information, the UE may receive a DMRS based on the DMRS information identified through the DCI and DMRS information included in the configuration information.

Hereinafter, a method of indicating increased DMRS information through DCI if the number of transport layers is increased as described above is described with respect to the aforementioned three alternatives.

First Embodiment

In the first embodiment, a method of indicating DMRS information by transmitting antenna port information of DMRS information through a higher layer signal (e.g., RRC signaling) and maintaining the amount of 3-bit information through th DMRS information is described.

To transmit, by an eNB, antenna port information to a UE through a higher layer signal may be construed as being an operation for an eNB to divide a plurality of users and to distribute DMRS ports to the plurality of users. For example, an eNB may perform user grouping so that a plurality of users is divided into user groups A and B, the users of the group A are allowed to use DMRS ports=7,8, and the users of the group B are allowed to use DMRS ports=11,13. Such an operation may generate a scheduling restriction.

More specifically, an eNB may set user grouping always fixedly for such an operation or may change user grouping over time using a user identifier (cell radio network temporary identifier (C-RNTI)) and subframe index information. For example, if user groups are two, a user group ID in a subframe n may be generated using Equation 4 below.

$$G_{ID} = c(n) \quad [\text{Equation 4}]$$

In this case, c(i) is a pseudo-random sequence and an initial state may be set as $c(i)=f(n_{RNTI})$.

In accordance with the first alternative (Alt-1), if the number of orthogonal transport layers for MU-MIMO is increased, increased DMRS information may be indicated as in Table 4 or Table 5.

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 5

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 11, $n_{SCID}$ = 0 | 0 | 2 layers, ports 11/13, $n_{SCID}$ = 0 |
| 1 | 1 layer, port 11, $n_{SCID}$ = 1 | 1 | 2 layers, ports 11/13, $n_{SCID}$ = 1 |
| 2 | 1 layer, port 13, $n_{SCID}$ = 0 | 2 | 3 layers, ports 7-9 |
| 3 | 1 layer, port 13, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In Table 4 and Table 5, parts indicated by the values 0 to 3 of the first column (one codeword) and the values 0 and 1 of the second column (two codewords) may be used to indicate DMRS information upon performing the MU-MIMO transmission.

In this case, the following two methods may be taken into consideration as a method of transferring the DMRS information to a UE through DCI.

The first method is a method of separately configuring a table based on the number of user groups as described above and providing notification that which user will use which table through RRC signaling. For example, if the number of user groups is 2, an eNB may configure two tables, such as Table 4 and Table 5, and may transmit information indicating that which table will be used to a UE through RRC signaling.

Furthermore, in the second method, a single table may be configured as in Table 6 regardless of the number of user groups, and a factor used in the table may be configured through RRC signaling.

For example, in Table 6, the value 0 of the first column may indicate any one of a port=7 and a port=11. Accordingly, when the value 0 is used, an eNB may notify a UE that the port=7 will be used or the port=11 will be used through RRC signaling. In this case, in Table 6, parts indicated by the values 0 to 3 of the first column (one codeword) and the values 0 and 1 of the second column (two codewords) may be used to indicate DMRS information upon performing the MU-MIMO transmission.

In all the embodiments of the present disclosure, a method of indicating DMRS information based on the number of a plurality of user groups as in the first embodiment may be used according to two methods like the aforementioned methods. Furthermore, in all of the following examples, only the first method is described as an example, but the scope of right of the present disclosure is not limited thereto. That is, the present disclosure may include a method of indicating DMRS information according to the second method.

TABLE 6

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 or 11, $n_{SCID}$ = 0 | 0 | 2 layers, ports 7-8 or 11/13, $n_{SCID}$ = 0 |
| 1 | 1 layer, port 7 or 11, $n_{SCID}$ = 1 | 1 | 2 layers, ports 7-8 or 11/13, $n_{SCID}$ = 1 |
| 2 | 1 layer, port 8 or 13, $n_{SCID}$ = 0 | 2 | 3 layers, ports 7-9 |
| 3 | 1 layer, port 8 or 13, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Next, according to the second alternative (Alt-2), increased DMRS information may be indicated using Table 4 and Table 7 below with respect to a case where the number of orthogonal transport layers for MU-MIMO is increased. In Table 7, parts indicated by the values 0 to 3 of the first column (one codeword) and the values 0 and 1 of the second column (two codewords) may be used to indicate DMRS information upon performing the MU-MIMO transmission.

TABLE 7

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 9, $n_{SCID}$ = 0 | 0 | 2 layers, ports 9-10, $n_{SCID}$ = 0 |

TABLE 7-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 1 | 1 layer, port 9, $n_{SCID}$ = 1 | 1 | 2 layers, ports 9-10, $n_{SCID}$ = 1 |
| 2 | 1 layer, port 10, $n_{SCID}$ = 0 | 2 | 3 layers, ports 7-9 |
| 3 | 1 layer, port 10, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Finally, in accordance with the third alternative (Alt-3), increased DMRS information may be indicated using Tables 4, 5 and 7 and Table 8 below with respect to a case where the number of orthogonal transport layers for MU-MIMO is increased. Accordingly, in this case, an eNB may configure 4 user groups and provide notification of the 4 user groups through RRC. In Table 8, parts indicated by the values 0 to 3 of the first column (one codeword) and the values 0 and 1 of the second column (two codewords) may be used to indicate DMRS information upon performing the MU-MIMO transmission.

TABLE 8

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 12, $n_{SCID}$ = 0 | 0 | 2 layers, ports 12/14, $n_{SCID}$ = 0 |
| 1 | 1 layer, port 12, $n_{SCID}$ = 1 | 1 | 2 layers, ports 12/14, $n_{SCID}$ = 1 |
| 2 | 1 layer, port 14, $n_{SCID}$ = 0 | 2 | 3 layers, ports 7-9 |
| 3 | 1 layer, port 14, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Second Embodiment

In the second embodiment, a method of indicating DMRS information by maintaining the amount of 3-bit information by not using scrambling identity ($n_{SCID}$) information of DMRS information is described. As described in Equation 2, the scrambling identity ($n_{SCID}$) is a value related to the scrambling of a DMRS. As may be seen from Equation 2, an eNB may generate the initial value of the scrambling of a DMRS using $n_{ID}^{(n_{SCID})}$, that is, a virtual Cell ID value, even without using a scrambling identity ($n_{SCID}$) However, for a CoMP operation, $n_{SCID}$ needs to be dynamically signaled. Accordingly, there may be a method not using $n_{SCID}$ information in the FD-MIMO system without performing CoMP. If CoMP and FD-MIMO are used at the same time, scrambling identity ($n_{SCID}$) information may be necessary.

If scrambling identity ($n_{SCID}$) information is not used as in the second embodiment, first, an eNB may indicate increased DMRS information using Table 9 with respect to a case where the number of orthogonal transport layers for MU-MIMO is increased according to the first alternative (Alt-1).

In this case, in Table 9, parts indicated by the values 0 to 3 of the first column (one codeword) and the values 0 and 1 of the second column (two codewords) may be used to indicate DMRS information upon performing the MU-MIMO transmission.

TABLE 9

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 | 0 | 2 layers, ports 7-8 |
| 1 | 1 layer, port 8 | 1 | 2 layers, ports 11/13 |
| 2 | 1 layer, port 11 | 2 | 3 layers, ports 7-9 |
| 3 | 1 layer, port 13 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In this case, the following two methods may be taken into consideration as a method for an eNB to transfer DMRS information to a UE through DCI.

First, an eNB may define a new DCI format and use the new table.

Second, an eNB may maintain the existing DCI format without any change, may modify and indicate the existing table as in Table 10, and may configure a factor in the table through RRC signaling. For example, in Table 10, when the value 1 of the second column is used, an eNB may indicate that (ports 7-8, nSCID=1) will be used or ports 11/13 will be used through RRC signaling. In this case, in Table 10, parts indicated by the values 0 to 3 of the first column (one codeword) and the values 0 and 1 of the second column (two codewords) may be used to indicate DMRS information upon performing the MU-MIMO transmission.

In all the embodiments of the present disclosure, a legacy table and a newly defined table may be used according to two methods as in the aforementioned method. That is, an eNB may define a new DCI format, may use the new DCI format, and may indicate a part modified in the existing table using RRC signaling while maintaining the DCI format. In all of the following examples, DMRS information is described by taking the first method as an example, but the scope of the present disclosure is not limited thereto.

TABLE 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, (port 7, $n_{SCID}$ = 0) or port 7 | 0 | 2 layers, (ports 7-8, $n_{SCID}$ = 0) or ports 7-8 |
| 1 | 1 layer, (port 7, $n_{SCID}$ = 1) or port 8 | 1 | 2 layers, (ports 7-8, $n_{SCID}$ = 1) or ports 11/13 |
| 2 | 1 layer, (port 8, $n_{SCID}$ = 0) or port 11 | 2 | 3 layers, ports 7-9 |
| 3 | 1 layer, (port 8, $n_{SCID}$ = 1) or port 13 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Next, according to the second alternative (Alt-2), an eNB may indicate increased DMRS information using Table 11 with respect to a case where the number of orthogonal transport layers for MU-MIMO is increased. In this case, in Table 11, parts indicated by the values 0 to 3 of the first column (one codeword) and the values 0 and 1 of the second column (two codewords) may be used to indicate DMRS information upon performing the MU-MIMO transmission.

TABLE 11

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 | 0 | 2 layers, ports 7-8 |
| 1 | 1 layer, port 8 | 1 | 2 layers, ports 9-10 |
| 2 | 1 layer, port 9 | 2 | 3 layers, ports 7-9 |
| 3 | 1 layer, port 10 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Finally, according to the third alternative (Alt-3), an eNB may indicate increased DMRS information using Table 9 and Table 12 with respect to a case where the number of orthogonal transport layers for MU-MIMO is increased. In this case, in Table 12, parts indicated by the values 0 to 3 of the first column (one codeword) and the values 0 and 1 of the second column (two codewords) may be used to indicate DMRS information upon performing the MU-MIMO transmission.

In this case, such a method may be used in a hybrid form with the method of the first embodiment. For example, a user who uses Table 9 and a user who uses Table 12 may be transmitted through RRC signaling. That is, an eNB may transmit information indicating that which DMRS-related table is used to each UE through RRC signaling.

TABLE 12

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 9 | 0 | 2 layers, ports 9-10 |
| 1 | 1 layer, port 10 | 1 | 2 layers, ports 12/14 |
| 2 | 1 layer, port 12 | 2 | 3 layers, ports 7-9 |
| 3 | 1 layer, port 14 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

Third Embodiment

In the third embodiment, an eNB may not use information related to the number of layers that belongs to DMRS information. In the present embodiment, a method of indicating DMRS information by maintaining the amount of 3-bit information by not using some of the number of layers and rank information is described.

A case where ranks 3/5/6/7 are not used is described as an example. If such a method is used, restriction may be generated from the point of view that rank adaptation is performed.

If rank information is not used as in the third embodiment, first, in accordance with the first alternative (Alt-1), an eNB may indicate increased DMRS information using Table 13 with respect to a case where the number of orthogonal transport layers for MU-MIMO is increased. In Table 13, parts indicated by the values 0 to 5 of the first column (one codeword) and the values 0 to 3 of the second column (two codewords) may be used to indicate DMRS information upon performing the MU-MIMO transmission. In Table 13, scrambling identity ($n_{SCID}$) information cannot be used for the values 4 and 5 of the first column. This may apply restriction to a CoMP operation.

TABLE 13

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 11/13, $n_{SCID} = 0$ |
| 3 | 1 layer, port 8, $n_{SCID} = 1$ | 3 | 2 layers, ports 11/13, $n_{SCID} = 1$ |
| 4 | 1 layers, ports 11 | 4 | 4 layers, ports 7-10 |
| 5 | 1 layers, ports 13 | 5 | 8 layers, ports 7-14 |
| 6 | 2 layers, ports 7-8 | 6 | Reserved |
| 7 | 4 layers, ports 7-10 | 7 | Reserved |

Next, according to the second alternative (Alt-2), an eNB may indicate increased DMRS information using Table 14 with respect to a case where the number of orthogonal transport layers for MU-MIMO is increased. In Table 14, parts indicated by the values 0 to 5 of the first column (one codeword) and the values 0 to 3 of the second column (two codewords) may be used to indicate DMRS information upon performing the MU-MIMO transmission. In Table 14, scrambling identity ($n_{SCID}$) information cannot be also used for the values 4 and 5 of the first column. This may apply restriction to a CoMP operation.

TABLE 14

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 1 layers, ports 9 | 4 | 4 layers, ports 7-10 |
| 5 | 1 layers, ports 10 | 5 | 8 layers, ports 7-14 |
| 6 | 2 layers, ports 7-8 | 6 | Reserved |
| 7 | 4 layers, ports 7-10 | 7 | Reserved |

Finally, according to the third alternative (Alt-3), an eNB may indicate increased DMRS information using Table 13 and Table 15 with respect to a case where the number of orthogonal transport layers for MU-MIMO is increased. In Table 15, parts indicated by the values 0 to 5 of the first column (one codeword) and the values 0 to 3 of the second column (two codewords) may be used to indicate DMRS information upon performing the MU-MIMO transmission.

In this case, this is used in a hybrid form with the method of the first embodiment. For example, a user who uses Table 13 and a user who uses Table 15 may be transferred through RRC signaling. That is, an eNB may transmit information indicating that which DMRS-related table is used to each UE through RRC signaling.

TABLE 15

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 9, $n_{SCID} = 0$ | 0 | 2 layers, ports 9-10, $n_{SCID} = 0$ |
| 1 | 1 layer, port 9, $n_{SCID} = 1$ | 1 | 2 layers, ports 9-10, $n_{SCID} = 1$ |
| 2 | 1 layer, port 10, $n_{SCID} = 0$ | 2 | 2 layers, ports 12/14, $n_{SCID} = 0$ |
| 3 | 1 layer, port 10, $n_{SCID} = 1$ | 3 | 2 layers, ports 12/14, $n_{SCID} = 1$ |
| 4 | 1 layers, ports 12 | 4 | 4 layers, ports 7-10 |
| 5 | 1 layers, ports 14 | 5 | 8 layers, ports 7-14 |
| 6 | 2 layers, ports 7-8 | 6 | Reserved |
| 7 | 4 layers, ports 7-10 | 7 | Reserved |

Fourth Embodiment

In the fourth embodiment, a method of indicating DMRS information by separately defining a DCI format for MU-MIMO only and maintaining the amount of 3-bit information is described. Accordingly, for an SU-MIMO operation, DCI different from the existing DCI needs to be used.

If a DCI format for MU-MIMO only is separately defined as in the fourth embodiment, first, in accordance with the first alternative (Alt-1), an eNB may indicate increased DMRS information using Table 16 with respect to a case where the number of orthogonal transport layers for MU-MIMO is increased. In Table 16, parts indicated by the values 0 to 7 of the first column (one codeword) and the values 0 to 3 of the second column (two codewords) may be used to indicate DMRS information upon performing the MU-MIMO transmission.

TABLE 16

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 11/13, $n_{SCID} = 0$ |
| 3 | 1 layer, port 8, $n_{SCID} = 1$ | 3 | 2 layers, ports 11/13, $n_{SCID} = 1$ |
| 4 | 1 layers, ports 11, $n_{SCID} = 0$ | 4 | Reserved |
| 5 | 1 layers, ports 11, $n_{SCID} = 1$ | 5 | Reserved |
| 6 | 1 layers, ports 13, $n_{SCID} = 0$ | 6 | Reserved |
| 7 | 1 layers, ports 13, $n_{SCID} = 1$ | 7 | Reserved |

Additionally, MU-MIMO pairing may be taken into consideration as 3-layer and 1-layer transmission with respect to two users. In this case, an eNB may indicate increased DMRS information using Table 17.

In Table 17, (3 layers, ports 8/11/13, nSCID=0) has been configured for the value 4 of the second column. However, this may be substituted with another configuration using 3 layers (3 layers, ports 7/11/13, nSCID=0), (3 layers, ports 7/8/13, nSCID=0), and (3 layers, ports 7/8/11, nSCID=0). In this case, a scrambling identity (nSCID) may also be set to 1.

Furthermore, in Table 17, parts indicated by the values 0 to 7 of the first column (one codeword) and the values 0 to 4 of the second column (two codewords) may be used to indicate DMRS information upon performing the MU-MIMO transmission.

Meanwhile, in all of the cases of the fourth embodiment, as described above, if MU-MIMO pairing of 3 layers and 1 layer is taken into consideration with respect to two users, the following method may be used. However, this is not taken into consideration in all of the following examples, for convenience of description.

TABLE 17

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 11/13, $n_{SCID} = 0$ |
| 3 | 1 layer, port 8, $n_{SCID} = 1$ | 3 | 2 layers, ports 11/13, $n_{SCID} = 1$ |
| 4 | 1 layers, ports 11, $n_{SCID} = 0$ | 4 | 3 layers, ports 8/11/13, $n_{SCID} = 0$ |
| 5 | 1 layers, ports 11, $n_{SCID} = 1$ | 5 | Reserved |
| 6 | 1 layers, ports 13, $n_{SCID} = 0$ | 6 | Reserved |
| 7 | 1 layers, ports 13, $n_{SCID} = 1$ | 7 | Reserved |

Next, according to the second alternative (Alt-2), an eNB may indicate increased DMRS information using Table 18 with respect to a case where the number of orthogonal transport layers for MU-MIMO is increased. In Table 18, parts indicated by the values 0 to 7 of the first column (one codeword) and the values 0 to 3 of the second column (two codewords) may be used to indicate DMRS information upon performing the MU-MIMO transmission.

TABLE 18

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 1 layers, ports 9, $n_{SCID} = 0$ | 4 | Reserved |
| 5 | 1 layers, ports 9, $n_{SCID} = 1$ | 5 | Reserved |
| 6 | 1 layers, ports 10, $n_{SCID} = 0$ | 6 | Reserved |
| 7 | 1 layers, ports 10, $n_{SCID} = 1$ | 7 | Reserved |

Finally, according to the third alternative (Alt-3), an eNB may indicate increased DMRS information using Table 16 and Table 19 with respect to a case where the number of orthogonal transport layers for MU-MIMO is increased. In Table 19, parts indicated by the values 0 to 7 of the first column (one codeword) and the values 0 to 3 of the second column (two codewords) may be used to indicate DMRS information upon performing the MU-MIMO transmission.

In this case, this is used in a hybrid form with the method of the first embodiment. For example, a user who uses Table 16 and a user who uses Table 19 may be transferred through RRC signaling. That is, an eNB may transmit information indicating that which DMRS-related table is used to each UE through RRC signaling.

TABLE 19

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 9, $n_{SCID} = 0$ | 0 | 2 layers, ports 9-10, nSCID = 0 |
| 1 | 1 layer, port 9, $n_{SCID} = 1$ | 1 | 2 layers, ports 9-10, nSCID = 1 |
| 2 | 1 layer, port 10, $n_{SCID} = 0$ | 2 | 2 layers, ports 12/14, nSCID = 0 |
| 3 | 1 layer, port 10, $n_{SCID} = 1$ | 3 | 2 layers, ports 12/14, nSCID = 1 |
| 4 | 1 layers, ports 12, $n_{SCID} = 0$ | 4 | Reserved |
| 5 | 1 layers, ports 12, $n_{SCID} = 1$ | 5 | Reserved |
| 6 | 1 layers, ports 14, $n_{SCID} = 0$ | 6 | Reserved |
| 7 | 1 layers, ports 14, $n_{SCID} = 1$ | 7 | Reserved |

Fifth Embodiment

The following embodiment is a method of indicating increased DMRS information using 4 bits.

According to the first alternative (Alt-1), increased DMRS information may be indicated using Table 20 with respect to a case where the number of orthogonal transport layers for MU-MIMO is increased. In Table 20, parts indicated by the values 0 to 7 of the first column (one codeword) and the values 0 to 3 of the second column (two codewords) may be used to indicate DMRS information upon performing the MU-MIMO transmission.

TABLE 20

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 11/13, $n_{SCID} = 0$ |
| 3 | 1 layer, port 8, $n_{SCID} = 1$ | 3 | 2 layers, ports 11/13, $n_{SCID} = 1$ |
| 4 | 1 layer, port 11, $n_{SCID} = 0$ | 4 | 3 layers, ports 7-9 |
| 5 | 1 layer, port 11, $n_{SCID} = 1$ | 5 | 4 layers, ports 7-10 |
| 6 | 1 layer, port 13, $n_{SCID} = 0$ | 6 | 5 layers, ports 7-11 |
| 7 | 1 layer, port 13., $n_{SCID} = 1$ | 7 | 6 layers, ports 7-12 |
| 8 | 2 layers, ports 7/8 | 8 | 7 layers, ports 7-13 |
| 9 | 3 layers, ports 7-9 | 9 | 8 layers, ports 7-14 |
| 10 | 4 layers, ports 7-10 | 10 | Reserved |
| 11 | Reserved | 11 | Reserved |
| 12 | Reserved | 12 | Reserved |
| 13 | Reserved | 13 | Reserved |
| 14 | Reserved | 14 | Reserved |
| 15 | Reserved | 15 | Reserved |

Additionally, as in the fourth embodiment, 3-layer transmission may be additionally configured using a reserved space.

Next, according to the second alternative (Alt-2), an eNB may indicate increased DMRS information using Table 21 with respect to a case where the number of orthogonal transport layers for MU-MIMO is increased. In Table 21, parts indicated by the values 0 to 7 of the first column (one codeword) and the values 0 to 3 of the second column (two codewords) may be used to indicate DMRS information upon performing the MU-MIMO transmission.

TABLE 21

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID} = 0$ | 0 | 2 layers, ports 7-8, $n_{SCID} = 0$ |
| 1 | 1 layer, port 7, $n_{SCID} = 1$ | 1 | 2 layers, ports 7-8, $n_{SCID} = 1$ |
| 2 | 1 layer, port 8, $n_{SCID} = 0$ | 2 | 2 layers, ports 9-10, $n_{SCID} = 0$ |
| 3 | 1 layer, port 8, $n_{SCID} = 1$ | 3 | 2 layers, ports 9-10, $n_{SCID} = 1$ |
| 4 | 1 layer, port 9, $n_{SCID} = 0$ | 4 | 3 layers, ports 7-9 |
| 5 | 1 layer, port 9, $n_{SCID} = 1$ | 5 | 4 layers, ports 7-10 |
| 6 | 1 layer, port 10, $n_{SCID} = 0$ | 6 | 5 layers, ports 7-11 |
| 7 | 1 layer, port 10., $n_{SCID} = 1$ | 7 | 6 layers, ports 7-12 |
| 8 | 2 layers, ports 7/8 | 8 | 7 layers, ports 7-13 |
| 9 | 3 layers, ports 7-9 | 9 | 8 layers, ports 7-14 |
| 10 | 4 layers, ports 7-10 | 10 | Reserved |
| 11 | Reserved | 11 | Reserved |
| 12 | Reserved | 12 | Reserved |
| 13 | Reserved | 13 | Reserved |
| 14 | Reserved | 14 | Reserved |
| 15 | Reserved | 15 | Reserved |

Finally, according to the third alternative (Alt-3), an eNB may indicate increased DMRS information using Table 22 with respect to a case where the number of orthogonal transport layers for MU-MIMO is increased. In this case, scrambling identity ($n_{SCID}$) information may not be used. In Table 22, parts indicated by the values 0 to 7 of the first column (one codeword) and the values 0 to 3 of the second column (two codewords) may be used to indicate DMRS information upon performing the MU-MIMO transmission.

TABLE 22

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7 | 0 | 2 layers, ports 7-8 |
| 1 | 1 layer, port 8 | 1 | 2 layers, ports 9-10 |
| 2 | 1 layer, port 9 | 2 | 2 layers, ports 11/13 |
| 3 | 1 layer, port 10 | 3 | 2 layers, ports 12/14 |
| 4 | 1 layer, port 11 | 4 | 3 layers, ports 7-9 |
| 5 | 1 layer, port 12 | 5 | 4 layers, ports 7-10 |
| 6 | 1 layer, port 13 | 6 | 5 layers, ports 7-11 |
| 7 | 1 layer, port 14 | 7 | 6 layers, ports 7-12 |
| 8 | 2 layers, ports 7/8 | 8 | 7 layers, ports 7-13 |
| 9 | 3 layers, ports 7-9 | 9 | 8 layers, ports 7-14 |
| 10 | 4 layers, ports 7-10 | 10 | Reserved |
| 11 | Reserved | 11 | Reserved |
| 12 | Reserved | 12 | Reserved |

TABLE 22-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 13 | Reserved | 13 | Reserved |
| 14 | Reserved | 14 | Reserved |
| 15 | Reserved | 15 | Reserved |

In accordance with an embodiment of the present disclosure, if the FD-MIMO system supports MU-MIMO using more orthogonal transport layers, a method of indicating corresponding DMRS information through DCI is the same as those shown in Table 4 to Table 22. If the FD-MIMO system operates using Table 4 to Table 22 and falls back to DCI 1A, it may use one DMRS antenna port p=7 in an MBSFN subframe and operate based on the existing legacy table.

Figure 5:
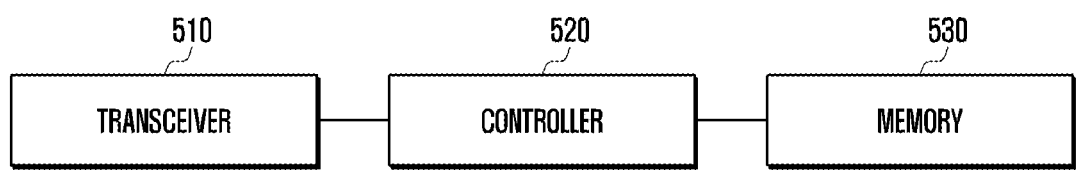
FIG. 5 is a diagram showing the configuration of a UE according to an embodiment of the present disclosure.

FIG. 5 is a diagram showing the configuration of a UE according to an embodiment of the present disclosure.

Referring to FIG. 5, the UE of the present disclosure may include a transceiver 510, a controller 520 and a memory 530.

The transceiver 510 may transmit or receive a signal to or from another network entity. The transceiver 510 may receive higher layer signaling from an eNB. Furthermore, the transceiver 510 may receive DCI from an eNB. Furthermore, the transceiver 510 may receive a reference signal from an eNB.

The controller 520 may control the operation of the UE described in the present disclosure. The controller 520 may perform control so that configuration information is received through higher layer signaling. The configuration information may include DMRS information. The DMRS information may include at least one of antenna port-related information, a scrambling identity and information related to the number of layers. Furthermore, if the number of DMRS-related tables stored in an eNB and the UE is two or more, the controller 520 may perform control so that an indicator indicative of a DMRS-related table to be used (hereinafter a DMRS-related table indicator) is received. The indicator may be included in DMRS information or may be transmitted as separate information.

Meanwhile, configuration information may not include DMRS information. The controller 520 may receive configuration information including only a DMRS-related table indicator.

Furthermore, the controller 520 may perform control so that DCI is received. The DCI may include a DMRS information indicator. If configuration information received through higher layer signaling includes at least one of antenna port-related information, a scrambling identity and information related to the number of layers, the DCI may include an indicator indicative of DMRS information other than information included in configuration information.

In contrast, if the configuration information does not include DMRS information, DCI may include an indicator indicative of DMRS information, including antenna port-related information, a scrambling identity and the number of layers.

The DMRS information indicator may have a predetermined number of bits. For example, the DMRS information may have 3 bits or 4 bits.

Furthermore, the controller 520 may analyze a DMRS-related table that has been previously stored or that is received from an eNB using a DMRS information indicator, and may identify DMRS information as a result of the analysis. That is, the controller 520 may identify the DMRS information indicated by the DMRS information indicator in the DMRS-related table.

If the number of DMRS-related tables previously stored or received from an eNB is two or more, the controller 520 may determine a DMRS-related table to be used based on configuration information received from the eNB. Furthermore, the controller 520 may identify DMRS information using the determined DMRS-related table and a DMRS information indicator. That is, the controller 520 may identify DMRS information indicated by the DMRS information indicator in the determined DMRS-related table.

Furthermore, the controller 520 may receive a DMRS based on identified DMRS information. Furthermore, if configuration information received through higher layer signaling includes at least one of DMRS information, the controller 520 may receive a DMRS based on DMRS information identified through DCI and DMRS information included in configuration information.

Accordingly, the controller 520 may use a received DMRS to decode data.

The memory 530 may store information transmitted or received by a UE. The memory 530 may store configuration information received through higher layer signaling. Furthermore, the memory 530 may store a DMRS information indicator received through DCI. Furthermore, the memory 530 may store a DMRS-related table including DMRS information. The memory 530 may store two or more DMRS-related tables. Furthermore, the memory 530 may store a DMRS-related table identifier indicative of any one of two or more DMRS-related tables. Furthermore, the memory 530 may store identified DMRS information.

Figure 6:
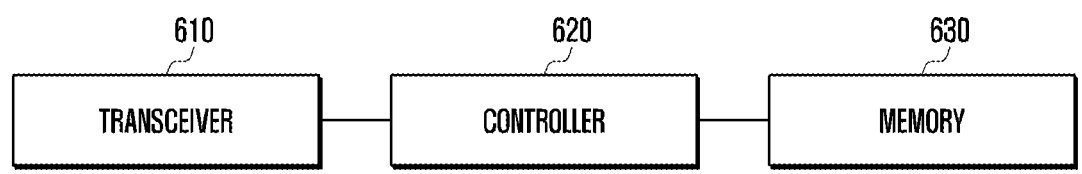
FIG. 6 is a diagram showing the configuration of an eNB according to an embodiment of the present disclosure.

FIG. 6 is a diagram showing the configuration of an eNB according to an embodiment of the present disclosure.

Referring to FIG. 6, the eNB of the present disclosure may include a transceiver 610, a controller 620 and a memory 630.

The transceiver 610 may transmit or receive a signal to or from another network entity. The transceiver 610 may transmit higher layer signaling to a UE. Furthermore, the transceiver 610 may transmit DCI to a UE. Furthermore, the transceiver 610 may transmit a reference signal to a UE.

The controller 620 may control the operation of the eNB described in the present disclosure. The controller 620 may perform control so that configuration information is transmitted to a UE through higher layer signaling. The configuration information may include DMRS information. The DMRS information may include at least one of antenna port-related information, a scrambling identity and information related to the number of layers. Furthermore, if the number of DMRS-related tables stored in the eNB and a UE is two or more, the controller 620 may perform control so that an indicator indicative of a DMRS-related table to be used (hereinafter a DMRS-related table indicator) to the UE. The indicator may be included in DMRS information or may be transmitted as separate information.

Meanwhile, configuration information may not include DMRS information. The controller 620 may transmit configuration information including only a DMRS-related table indicator.

Furthermore, the controller 620 may perform control so that DCI is transmitted. The DCI may include a DMRS information indicator. If configuration information received through higher layer signaling includes at least one of antenna port-related information, a scrambling identity and information related to the number of layers, DCI may include an indicator indicative of DMRS information other than information included in configuration information.

In contrast, if configuration information does not include DMRS information, DCI may include an indicator indicative of DMRS information, including antenna port-related information, a scrambling identity and the number of layers.

The DMR information indicator may have a predetermined number of bits. For example, the DMRS information may have 3 bits or 4 bits. The controller 620 may indicate DMRS information (antenna port information, a scrambling identity and the number of layers) using a DMRS-related table and a DMRS information indicator.

Furthermore, the controller 620 may transmit a DMRS based on DMRS information.

The memory 630 may store information transmitted or received by the eNB. The memory 630 may store configuration information transmitted through higher layer signaling. Furthermore, the memory 630 may store DMRS information and a DMRS information indicator transmitted through DCI. Furthermore, the memory 630 may store a DMRS-related table including DMRS information. The memory 630 may store two or more DMRS-related tables. Furthermore, the memory 630 may store a DMRS-related table identifier indicative of any one of two or more DMRS-related tables.

Meanwhile, a UE may receive CSI-IM (or an interference measurement resource (IMR)) allocated by an eNB along with the aforementioned CSI-RS. The resource of the CSI-IM may have the same resource structure and location as a CSI-RS supporting 4 ports. The CSI-IM is a resource for accurately measuring, by a UE receiving data from one or more eNBs, interference from an adjacent eNB. For example, if the amount of interference when an adjacent eNB transmits data and the amount of interference when an adjacent eNB does not transmit data are to be measured, an eNB may configure a CSI-RS and two CSI-IM resources. One CSI-IM resource may be configured for an adjacent eNB to always transmit a signal and the other CSI-IM resource may be configured for an adjacent eNB to not always transmit a signal. Accordingly, the amount of interference of an adjacent eNB can be effectively measured.

In order to measure DCI in a cellular system, an eNB needs to transmit a reference signal to a UE. In the case of a long term evolution-advanced (LTE-A) system of 3GPP, a UE may measure the channel state between an eNB and the UE using a CRS or CSI-RS transmitted by the eNB. Some factors must be basically taken into consideration in the channel state. The factors may include the amount of interference in the downlink. The amount of interference in the downlink includes an interference signal, heat noise, etc. generated by an antenna belonging to an adjacent eNB. This is important for a UE to determine a channel situation in the downlink. For example, if an eNB having one transmission antenna transmits a signal to a UE having one reception antenna, the UE determines energy per symbol that may be received in the downlink and the amount of interference to be received at the same time in the period in which a corresponding symbol is received using a reference signal received from an eNB, and needs to determine Es/Io. The determined Es/Io is converted into a data transfer rate or a corresponding value, and is transmitted to the eNB in the form of a channel quality indicator (CQI). The determined Es/Io may be used to determine that the eNB will perform transmission to the UE at which data transfer rate.

In the case of an LTE-A system, a UE may feed information about DCI back to an eNB so that the information is used for the downlink scheduling of the eNB. That is, the UE may measure a reference signal transmitted by the eNB in the downlink, and may feed information extracted from the reference signal back to the eNB in a form defined in the LTE/LTE-A standard. In LTE/LIE-A, information fed back by a UE may basically include the following three pieces of information.

A rank indicator (RI): the number of spatial layers which may be received by a UE in the current channel state A precoder matrix indicator (PMI): an indicator for a precoding matrix preferred by a UE in the current channel state A channel quality indicator (CQI): a maximum data rate at which a UE may receive data in the current channel state The CQI may be substituted with a signal to interference plus noise ratio (SINR) which may be used like a maximum data rate, a maximum error correction code rate and modulation method, data efficiency per frequency, etc.

The RI, PMI and CQI are associated to have meanings. For example, a precoding matrix supported in LTE/LTE-A has been differently defined for each rank. For this reason, a PMI value when the RI has a value of 1 and a PMI value when the RI has a value of 2 may be construed as being different although the values are the same. Furthermore, even when a UE determines a CQI, the UE assumes that a rank value and PMI value of which an eNB has been notified by the UE have been applied by the eNB. That is, if a UE has reported RI_X, PMI_Y and CQI_Z to an eNB, when a rank is RI_X and precoding is PMI_Y, this may mean that the UE may receive a data transfer rate corresponding to CQI_Z. As described above, when a UE computes a CQI, it assumes that which transmission method will be performed on an eNB so that the UE can obtain the optimized performance when it performs actual transmission according to the corresponding transmission method.

An eNB having many antennas in order to generate and report CSI has to configure a reference signal resource capable of measuring 8 or more antenna channels and to transmit it to a UE. However, as shown in FIG. 2, available CSI-RS resources may use a maximum of 48 REs, but up to 8 CSI-RSs per one cell may now be configured. Accordingly, there is a need for a new CSI-RS configuration method in order to support an FD-MIMO system capable of operating based on 8 or more CSI-RS ports.

Furthermore, according to an increase of the demands for dynamic precoding in the vertical direction, FD-MIMO including uniform planar array (UPA) antenna ports is actively discussed.

Accordingly, the present disclosure proposes a method for configuring various numbers of CSI-RSs by improving the current CSI-RS configuration method limited to {(1 or 2), 4, 8}.

Specifically, as described above, some problems may occur if a different number of CSI-RSs other than {(1 or 2), 4, 8} is configured by associating the existing one or more CSI-RS configuration methods. As one example of the problems, there is a problem in that a CSI-RS power boosting level may be different in each of the existing CSI-RS configurations. The current LTE/LTE-A standard has been defined so that a UE generates CSI, assuming that all CSI-RS ports corresponding to one PDSCH transmission are transmitted using the same transmission power. Accordingly, if transmission power of some or all of CSI-RS ports is different as in the above example, the assumption needs to be modified so that a UE can generate accurate CSI.

Accordingly, the present disclosure provides a method and apparatus for generating CSI for performing effective data transmission/reception in an FD-MIMO system based on LTE-A and sharing the generated CSI. Specifically, the present disclosure provides a method and apparatus for transmitting, by an eNB, configuration information (CSI-RS configuration) for a plurality of CSI-RSs to a UE and generating, by the UE, feedback information based on the configuration information in order to perform high efficiency data transmission/reception in the FD-MIMO system.

Figure 7:
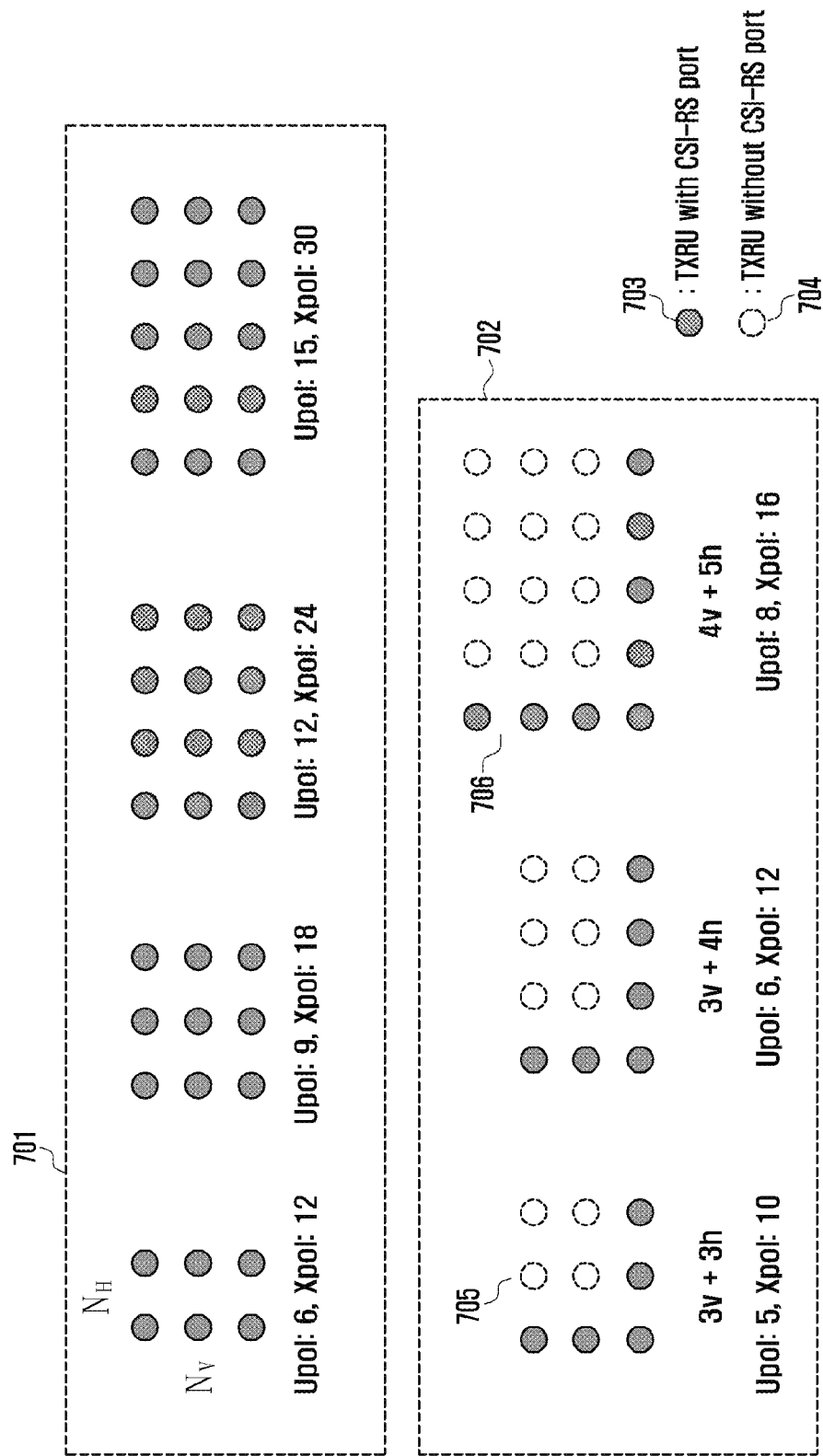
FIG. 7 is a diagram showing a CSI-RS configuration according to the present disclosure.

FIG. 7 is a diagram showing a CSI-RS configuration according to the present disclosure.

Referring to FIG. 7, 701 of FIG. 7 shows the number of CSI-RSs for a case where CSI-RS ports for all transceiver units (TXRUs) used for data transmission are estimated (full measurement). As shown in 701 of FIG. 7, an eNB may require various numbers of CSI-RSs depending on a horizontal port number NH, a vertical port number NV, and whether a polarization antenna is present or not. The 701 corresponds to some examples of FD-MIMO antenna array configurations, and it is evident that the horizontal port number NH and the vertical port number NV are not limited to the cases shown in 701.

702 of FIG. 7 shows the number of CSI-RSs for a case where CSI-RS ports for some of TXRUs used for data transmission are estimated (partial measurement). In 702 of FIG. 7, an eNB may include TXRUs 703 that estimate a channel through a CSI-RS and TXRUs 704 that do not estimate a channel without the allocation of a CSI-RS. Furthermore, the 702 is an example of CSI-RS puncturing, and a pattern whose channel estimation is omitted is not limited by 702.

Partial channel estimation, such as 702 of FIG. 7, has a disadvantage in that a full measurement versus channel estimation error is increased, but has an advantage in that CSI-RS resources can be significantly reduced. As in 705 of FIG. 7, if partial channel estimation is performed using a total of 5 CSI-RSs, the 3 CSI-RS ports in the horizontal direction may be used to determine CSI in the horizontal direction, and the 3 CSI-RS ports in the vertical direction may be used to determine CSI in the vertical direction.

Furthermore, referring to 706 of FIG. 7, if the size of an array is large and a cross-pol antenna is used, a large number of CSI-RSs may be necessary although partial measurement is performed.

Meanwhile, FIG. 7 is a diagram shown based on non-precoded CSI-RSs in which an eNB TXRU is mapped to a CSI-RS port in a one-to-one manner and all of the CSI-RS ports have the same directivity and beam width. However, the range of the present disclosure is not limited thereto, and it is evident that the present disclosure may be extended and applied to a beamformed CSI-RS operation in which a plurality of TXRUs is mapped to one CSI-RS port and a different beam may be used for each CSI-RS port. In this case, the location of the CSI-RS port may not have a direct relation with the geographical location of each TXRU.

As described above, in the current system, a maximum of up to 8 CSI-RSs can be configured for each eNB. Accordingly, there is a need for a new CSI-RS configuration method for supporting an FD-MIMO system. A method for configuring 8 CSI-RSs or more may include the following two methods.

Method 1: Configure a Plurality of CSI Processes

Method 2: Configure a Single CSI Process Including a Plurality of Pieces of CSI-RS Configuration Information (CSI-RS Configurations)

Figure 8:
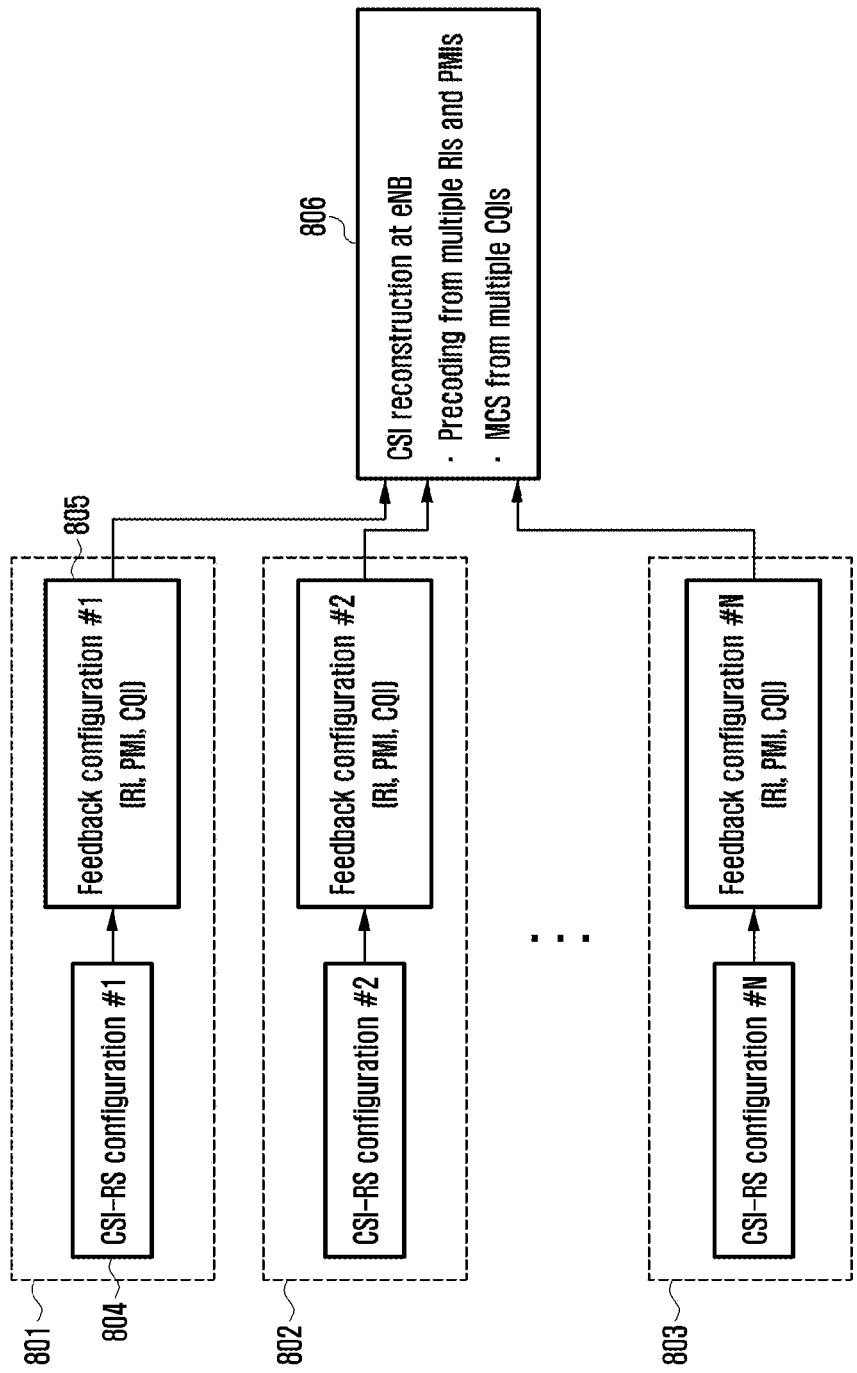
FIG. 8 is a diagram showing a method of configuring a plurality of CSI processes according to another embodiment of the present disclosure.

FIG. 8 is a diagram showing a method of configuring a plurality of CSI processes according to another embodiment of the present disclosure.

Referring to FIG. 8, an eNB may configure some existing CSI processes 801~803 capable of supporting a maximum of up to 8 CSI-RSs so that a UE can estimate channel information for a large number of CSI-RS ports. In this case, each CSI process may include each piece of CSI-RS configuration information. That is, the CSI process 801 may include CSI-RS configuration information #1, the CSI process 802 may include CSI-RS configuration information #2, and the CSI process 803 may include CSI-RS configuration information #3.

In this case, an RI, PMI and CQI 805 corresponding to each CSI process may have been associated according to a predetermined agreement. For example, if a CSI process No. 1 indicates channel information for a horizontal direction and a CSI process No. 2 indicates channel information for a vertical direction, an eNB may perform the Kronecker product of a report PMI 1 and PMI 2 and use the results of the Kronecker product as a precoding matrix for all of the channel. In this case, a joint CQI may be used as the product of a CQI 1 and CQI2 (806).

The method 1 has an advantage in that a CSI-RS pattern does not need to be newly designed for an FD-MIMO system because the existing CSI process is used without any change. In order to use the method 1 as described above, however, a CQI must be divided for each CSI process according to a specific rule and reported or a joint CQI must be newly defined.

Figure 9:
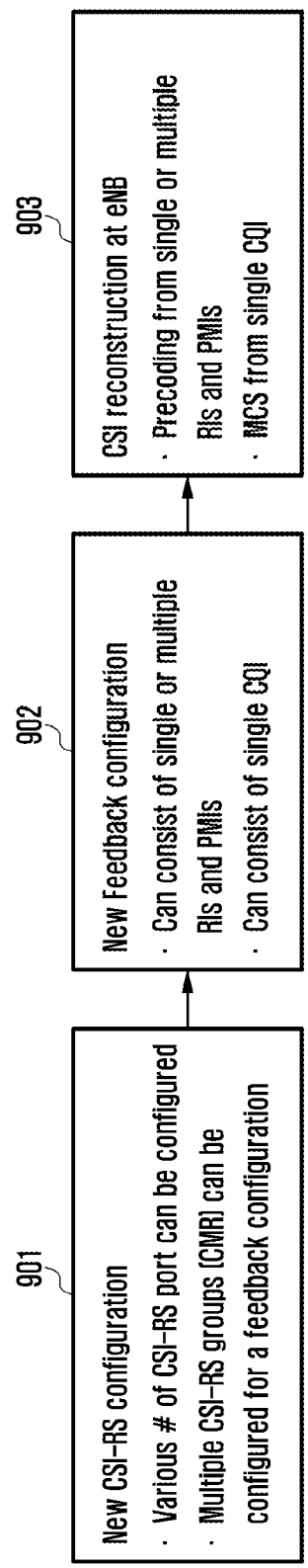
FIG. 9 is a diagram showing a method of configuring a single CSI process including a plurality of pieces of CSI-RS configuration information according to another embodiment of the present disclosure.

FIG. 9 is a diagram showing a method of configuring a single CSI process including a plurality of pieces of CSI-RS configuration information according to another embodiment of the present disclosure.

Referring to FIG. 9, an eNB may enable a UE to recognize CSI-RS ports which cannot be supported by a current system because one CSI process includes a plurality of pieces of CSI-RS configuration information (CSI-RS configurations), for example, 8 or more CSI-RS ports transmitted in one transmission point (TP) (901).

One or more CSI-RS resources configured by the plurality of CSI-RS configurations are for estimating CSI of a desired channel and may be called channel measurement resources (CMRs).

The CSI-RS configuration information (may be hereinafter interchangeably used with CSI-RS port configuration information) or information about a CMR may be transferred to a UE using various methods of directly notifying the UE of the RE location of each port, notifying the UE of a port configuration pattern or notifying the UE of information related to the existing CSI-RS group. The UE may generate feedback information, such as an RI, PMI or CQI, based on the CSI-RS port configuration information and previously configured feedback configuration information. In this case, the rank and direction of a channel may be reported as one or several RIs and PMIS according to a predetermined rule. Quality of the channel may also be divided into several CQIs and reported. In the method 2, however, channel quality may be reported as one CQI although a joint CQI is not newly defined because a plurality of CSI-RSs is directly associated with one piece of feedback configuration information (903).

As described above, the method 2 has an advantage in that the existing CQI can be used without any change without the need to define a new CQI, but it is necessary to design a new CSI-RS pattern or a new CSI-RS configuration method.

Accordingly, a detailed CSI-RS configuration method for the method 2 and a method of generating channel information in a UE according to the detailed CSI-RS configuration method, and a method of reporting channel information are described below.

FIG. 10 is a diagram showing a method of transmitting CSI-RS configuration information according to another embodiment of the present disclosure.

Referring to FIG. 10, a UE supporting Release 10 may receive a single CSI-RS resource allocated thereto through higher layer signaling as in FIG. 10. In this case, the higher layer signaling may include RRC signaling.

As shown in FIG. 10, the UE may receive configuration information related to a CSI-RS through a release 10 CSI-RS configuration 1000. Specifically, the UE may receive the number of CSI-RS ports as one of {1, 2, 4, 8} through antenna port information (antennaPortsCount) 1001 included in the CSI-RS configuration, may receive the location of a resource in which the corresponding CSI-RS will be transmitted through resource configuration information (resourceConfig) 1002, and may receive a CSI-RS transmission period and offset value through subframe configuration information (subframeConfig) 1003.

Furthermore, the UE may receive the ratio of PDSCH transmission power (PDSCH EPRE) to CSI-RS transmission power (CSI-RS EPRE, energy per RE) through power information (Pc) 1004 from an eNB. In this case, the power information Pc may be defined as in Equation 5 and may have a value of −8~15 dB.

$$P_c = \frac{PDSCH\ EPRE}{CSI-RS\ EPRE} \quad \text{[Equation 5]}$$

The eNB may variably adjust CSI-Rs transmission power for various purposes, such as channel estimation accuracy improvement. The UE may identify how much will be transmission power to be used for data transmission lower or higher than transmission power used for channel estimation through the notified Pc. The UE may compute an accurate CQI based on the parameters although the eNB changes CSI-RS transmission power, and may report the computed CQI to the eNB.

Figure 11:
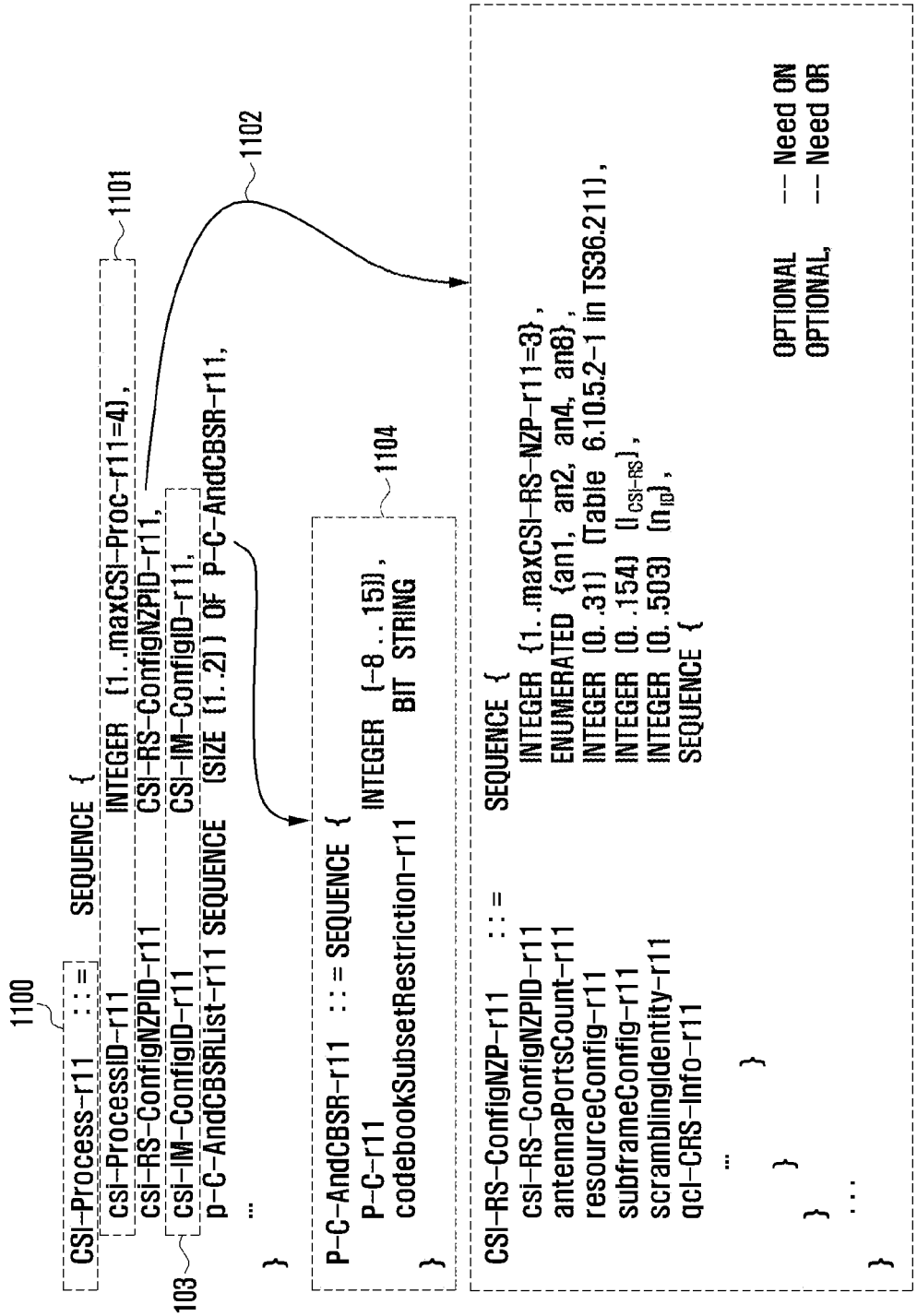
FIG. 11 is a diagram showing another method of transmitting CSI-RS configuration information according to another embodiment of the present disclosure.

FIG. 11 is a diagram showing another method of transmitting CSI-RS configuration information according to another embodiment of the present disclosure.

As shown in FIG. 11, a UE supporting Release 11 may receive a maximum of 4 CSI processes allocated thereto through higher layer signaling. In this case, the higher layer signaling may include RRC signaling.

Referring to FIG. 11, each CSI process configuration (1100) information may include a corresponding CSI process ID 1101, CSI-RS configuration information 1102 for desired channel measurement, CSI-IM configuration information 1103 for interference measurement, power information Pc and codebook restriction information 1104, etc.

In Release 11 and release 12, two types of subframes may be used for the interference control technology, such as an almost blank subframe (ABS). An eNB may configure a maximum of two types of power information Pc and codebook restriction information as in 1104, and may control a UE operation according to a subframe type.

A Release 11 UE may receive a maximum of three types of CSI-RSs and CSI-IM resources configured therefor. In this case, the CSI-RS configuration information 1102 is similar to the CSI-RS configuration information 1000 for a release 10 UE, but the power information Pc may not be included in the CSI configuration information 1102 because it is included in the power information and codebook restriction information 1104.

As shown in FIGS. 10 and 11, in the current standard, only one CSI-RS resource for each CSI process may be configured. Accordingly, in order for a UE to generate accurate CSI based on a plurality of CSI-RS resources connected to one process as in the aforementioned CMR, the CSI-RS configuration methods need to be improved for such an object.

Specifically, a portion that may become a problem in the CMR configuration or when a plurality of CSI-RS resources is configured in one CSI process is that a CSI-RS transmission power level may be different depending on the location of configured CSI-RS resources.

Figure 12:
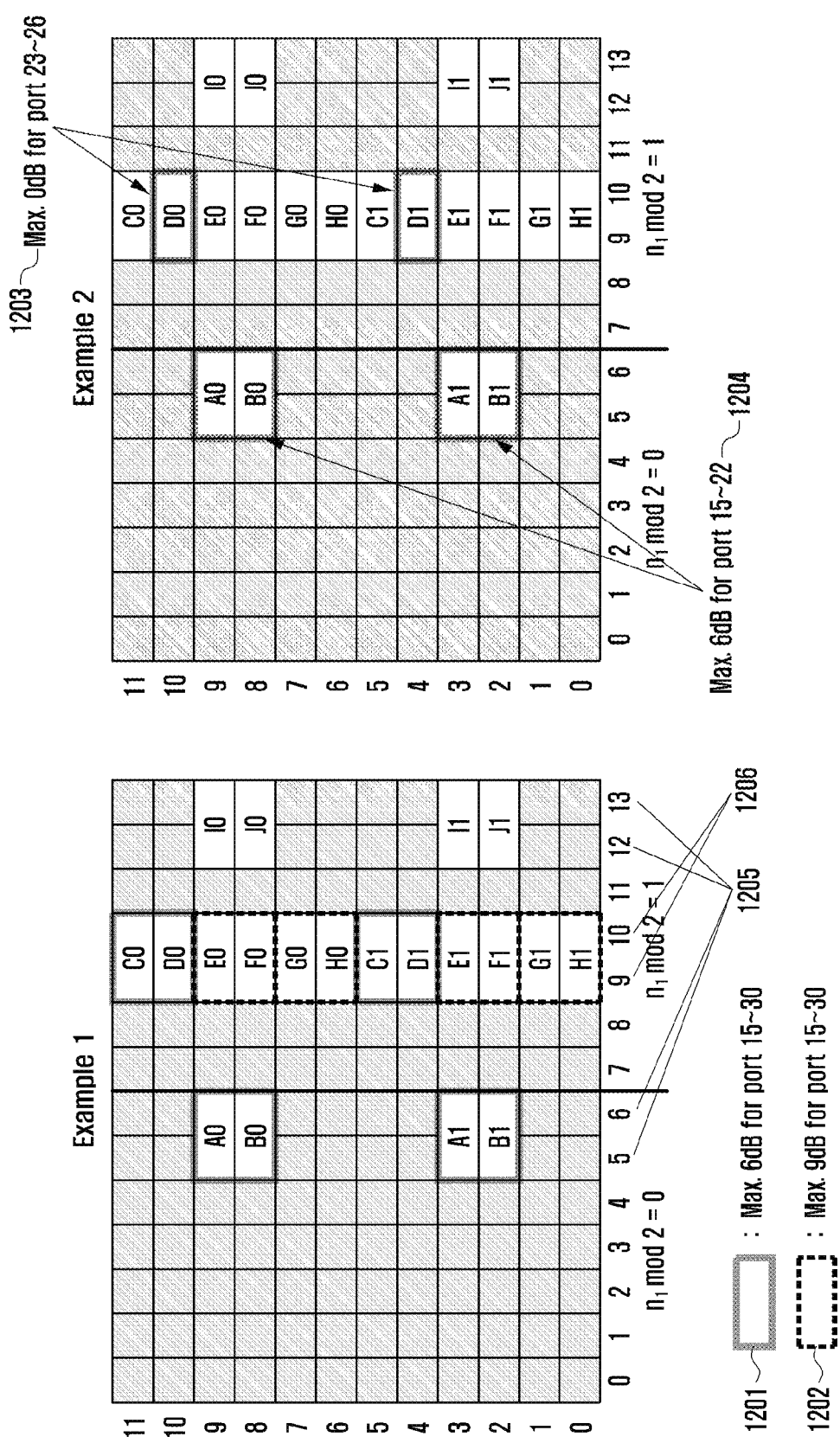
FIG. 12 is a diagram showing two examples in which two CMRs are configured.

FIG. 12 is a diagram showing two examples in which two CMRs are configured.

Referring to FIG. 12, the example of FIG. 12 shows a method of configuring a total of 16 CSI-RS ports by configuring two CSI-RS resources, each including 8 CSI-RS ports. As shown in FIG. 12, subcarriers capable of transmitting CSI-RSs in Nos. 5, 6, 12 and 13 OFDM symbols 1205 are Nos. 2, 3, 8 and 9. In contrast, CSI-RSs can be transmitted in all of subcarriers of Nos. 9 and 10 OFDM symbols 1206.

Accordingly, the example 1 of FIG. 12 shows that the highest available CSI-RS power boosting level may be different depending on the location of CSI-RS resources forming a CMR.

As shown by a solid line 1201 of the example 1, it is assumed that an eNB has configured the total of 16 CSI-RS ports by allocating 8 CSI-RS ports 15~22 to A0, B0, A1 and B1 through CSI-RS configuration information 1 (CSI-RS configuration 1) and allocating other 8 CSI-RS ports 23~30 to C0, D0, C1 and D1 through CSI-RS configuration information 2 (CSI-RS configuration 2). If the eNB has allocated the CSI-RS ports 15/16 A0, the ports 15/16 will not be transmitted in B0, A1 and B1 within the same OFDM symbol. Accordingly, the eNB can perform power boosting of up to 6 dB without adjusting transmission power for each OFDM (compared to a case where the ports 15/16 are transmitted in all of REs). That is, the eNB may transmit a CSI-RS by adding power in B0, A1 and B1, that is, the same OFDM symbols as the OFDM symbol A0 to which a CSI-RS port has been allocated, and this may be called power boosting.

That is, this figure shows that the eNB can identify that it can perform power boosting of up to 6 dB when it configures a CSI-RS using the symbols 1205 (1201).

In contrast, as shown by a dotted line 1202 of the example 1, it is assumed that the eNB has configured the total of 16 CSI-RS ports by allocating 8 CSI-RS ports 15~22 to E0, F0, E1 and F1 through the CSI-RS configuration information 1 (CSI-RS configuration 1) and allocating other 8 CSI-RS ports 23~30 to G0, H0, G1 and H1 through the CSI-RS configuration information 2 (CSI-RS configuration 2). If the eNB has allocated the CSI-RS ports 15/16 to E0, the ports 15/16 will not be transmitted in F0, G0, H0, E1, F1, G1 and H1 within the same OFDM symbol. Accordingly, the eNB can perform power boosting of up to 9 dB without adjusting transmission power for each OFDM (compared to a case where the ports 15/16 are transmitted in all of REs). That is, the eNB can identify that it can perform power boosting of up to 9 dB when it configures a CSI-RS using the symbols 1206 (1202).

The example 2 of FIG. 12 shows that pieces of CSI-RS configuration information (CSI-RS configurations) forming a CMR may have different highest available CSI-RS power boosting levels.

As in the example 2 of FIG. 12, it is assumed that an eNB has configured a total of 12 CSI-RS ports by allocating 8 CSI-RS ports 15~22 to A0, B0, A1 and B1 through CSI-RS configuration information 1 (CSI-RS configuration 1) and allocating other 4 CSI-RS ports 2326 to D0 and D1 through CSI-RS configuration information 2 (CSI-RS configuration 2).

As described in the example 1, power boosting of up to 6 dB may be performed on the CSI-RS ports 1522 configured by the CSI-RS configuration information 1 (configuration 1). In contrast, only power boosting of up to 3 dB may be performed on the CSI-RS ports 23~26 configured by the CSI-RS configuration information 2 (CSI-RS configuration 2).

From the example, it may be seen that a power boosting limit for each CSI-RS port may be differently determined according to a CMR configuration.

Meanwhile, the current LTE/LTE-A standard specifies that when a UE generates CSI, the FPRE of PDSCH transmitted through CSI-RS ports {15, . . . , 14+P} versus the FPRE of a CSI-RS is assumed to be the same as the power information Pc of Equation 5. This means that if a different size of power boosting is applied to each piece of CSI-RS configuration information (CSI-RS configuration) upon performing the CMR configuration, it may have an effect on the channel quality measurement of a UE. Accordingly, it is necessary to provide an accurate criterion for calculating the PDSCH EPRE in order to guarantee the measurement of accurate channel quality of a UE while not losing the flexibility of an eNB operation.

Accordingly, a detailed CSI-RS configuration method for an efficient CMR operation and a method of generating CSI in a UE according to the detailed CSI-RS configuration method, and a method of reporting CSI are described below. Furthermore, a method of configuring power information with respect to a plurality of CSI-RS configurations is described below.

Sixth Embodiment

In the sixth embodiment, a method of configuring one or more CSI-RS resources for a CMR configuration is described.

FIG. 13 is a diagram showing a method of configuring CSI-RS resources according to a sixth embodiment of the present disclosure.

Referring to FIG. 13, in order to configure a plurality of CSI-RSs included in a single CSI process, it is possible to manage a total of N non-zero power (NZP) CSI-RS resources as an ID list as in 1303 of FIG. 13. In this case, the number of CSI-RS ports included in each CSI-RS resource may be set like antenna port information (antennaPorts-Count) 1304. Total antenna port information (antennaPorts-CountTotal) 1302 may indicate the total number of CSI-RS ports set by a CSI process indicated by a CSI process ID 1301. In this case, the number of antenna ports set by the total antenna port information 1302 may be the same as or smaller than the sum of antenna ports set by the antenna port information 1304 of each of NZP CSI-RS configurations.

Alternatively, the total number of CSI-RS ports included in a CSI process indicated by the CSI process ID 1301 may be defined as the sum of CSI-RS ports set by the antenna port information 1304 of each of the NZP CSI-RS configurations. In this case, the total antenna port information 1302 may be omitted.

Alternatively, all of CSI-RS resources included in a CSI process indicated by the CSI process ID 1301 may be configured to have the same number of CSI-RS ports. In this case, the number of CSI-RS ports of each CSI-RS resource may be set by the total antenna port information 1302, and the antenna port information 1304 may be omitted.

The setting when the number of ports of the total antenna port information 1302 is selected is one example. In particular, in this example, the number of ports may be set to {an1, an2, an4, an8}. In the case of this example, the total number of CSI-RS ports included in a CMR may be defined as the product of the number of CSI-RS ports set by the total antenna port information 1302 and the number of CSI-RS resources.

FIG. 14 is a diagram showing another method of configuring CSI-RS resources according to the sixth embodiment of the present disclosure.

FIG. 14 is another example in which a plurality of CSI-RSs included in a single CSI process is configured. As in 1403 of FIG. 14, a total of N non-zero power (NZP) CSI-RS resources may be directly configured. FIG. 14 is an example in which N=2. As in the example of FIG. 13, in a CSI process designated by a CSI process ID 1401, the total number of CSI-RS ports may be designated like total antenna port information 1402. Furthermore, it is evident that 1402 may be omitted like 1302.

Seventh Embodiment

In the seventh embodiment, a method of configuring power information Pc for a CMR is described. In the seventh embodiment, it is assumed that different power information (Pc) values are not set in a UE in one CMR. In other words, what a UE can assume that when it generates CSI, a corresponding eNB applies power boosting always having the same size to CSI-RS configuration information (CSI-RS configurations) included in one CMR is regulated in the standard.

In an example for implementing the seventh embodiment, when maximum available power information Pc of various sizes for each CSI-RS are present, an eNB applies the smallest power information Pc of them to CSI-RS configuration information (CSI-RS configuration). The seventh embodiment is characterized in that it has a very small effect on the standard, but limits selection related to CSI-RS power boosting of an eNB.

Eighth Embodiment

In the eighth embodiment, another method of configuring power information for a CMR is described.

FIG. 15 is a diagram showing a method of configuring power information according to an eighth embodiment of the present disclosure.

Referring to FIG. 15, in the eighth embodiment, an eNB may configure one piece of power information (Pc) 1503 for each CSI process. Alternatively, if an ABS is taken into consideration like 1104 of 1104, the eNB may configure 2 pieces of transmission power Pc for each CSI process. Furthermore, the eNB may configure power ratio information (Delta_Pc) 1504 for each piece of CSI-RS resource configuration information (CSI-RS resource configuration). In this case, the CSI-RS resource configuration may include CSI-RS configuration information (CSI-RS configuration), subframe configuration information (subframe configuration), power information, etc. Furthermore, the CSI-RS resource configuration may include a plurality of pieces of CSI-RS configuration information. For example, the CSI-RS resource configuration may include two pieces of 8-port CSI-RS configuration information and indicate 16-port CSI-RS information.

The power ratio information Delta_Pc may mean the ratio of the corresponding CSI-RS EPRE to representative CSI-RS EPRE set by an eNB or a difference therebetween. In this case, the power ratio information may mean the difference between pieces of power in addition to the ratio of power. Furthermore, the representative CSI-RS EPRE may mean the power information 1503 configured through a higher layer. For another example, the Delta_Pc may mean the ratio of PDSCH EPRE and CSI-RS EPRE when the corresponding CSI-RS EPRE is identically used for all of types of CSI-RS port transmission.

The power ratio information Delta_Pc 1504 may be configured as any one of values of α to β. As an example of α and β, an eNB may set an irregular value like α=−8 dB and β=15 dB. As another example, an eNB may set an equal value like α=−6 dB and β=6 dB.

When a UE performs channel estimation, it may adjust a channel gain in each CSI-RS port based on the power information Pc using the power ratio information Delta_Pc. Thereafter, the UE may compute a CQI based on the power information Pc in the same manner as a conventional technology (the same method as that of a case where a CSI-RS has been allocated as in FIG. 10 or 11).

FIG. 15 is an example of higher layer signaling for the eighth embodiment. In FIG. 15, the eighth embodiment has been described based on the configuration method in FIG. 11 of the sixth embodiment, but is not limited thereto and may be applied based on the various methods described in the sixth embodiment, such as FIG. 14.

Furthermore, the power ratio information Delta_Pc may have been previously determined depending on the number of ports of a CSI-RS configuration included in a CMR. For example, in FIG. 15, power ratio information Delta_Pc=−3 dB may have been previously determined with respect to a case where antenna port information (antennaPortsCnt-r1x) is an1 or an2, power ratio information Delta_Pc=3 dB may have been previously determined with respect to a case where antenna port information is an4, and power ratio information Delta_Pc=0 dB may have been previously determined with respect to a case where antenna port information is an8. If the power ratio information is predetermined as described above, the power ratio information 1504 may be omitted.

Ninth Embodiment

In the ninth embodiment, yet another method of configuring power information for a CMR is described.

FIG. 16 is a diagram showing a method of configuring power information according to a ninth embodiment of the present disclosure.

Referring to FIG. 16, in the ninth embodiment, an eNB may configure power information Pc one by one (1603) with respect to each CSI-RS resource configuration. Furthermore, if an ABS is taken into consideration as in 1104 of FIG. 11, the eNB may configure two pieces of power information Pc for each CSI process. If a reference flag for power information Pc is configured as in a reference flag 1602 of FIG. 16, a UE may generate CSI based on a CSI-RS whose reference flag 1602 is true upon performing the channel estimation.

For another example, if the reference flag 1602 is omitted, a UE may generate CSI, assuming that the power information 1603 means the ratio of PDSCH FPRE and CSI-RS FPRE when the corresponding CSI-RS FPRE is identically used for all of types of CSI-RS port transmission.

FIG. 16 is an example of higher layer signaling for the ninth embodiment. In FIG. 16, the ninth embodiment has been described based on a configuration method, such as FIG. 14 of the sixth embodiment, but is not limited thereto and may be applied based on the various methods described in the sixth embodiment, such as FIG. 13.

Tenth Embodiment

In the tenth embodiment, yet another method of configuring power information for a CMR is described.

FIG. 17 is a diagram showing a method of configuring power information according to a tenth embodiment of the present disclosure.

Referring to FIG. 17, in the tenth embodiment, an eNB may configure one piece of power information (Pc) 1704 for each CSI process. Furthermore, if an ABS is taken into consideration as in 1104 of FIG. 11, the eNB may configure two pieces of the power information Pc for each CSI process.

For example, the power information 1704 may be a value indicative of power information Pc for the first resource 1702 of two CSI-RS resources that form a CMR. In this case, power information Pc for a second resource 1703 may be configured as in Equation 6.

$$P_c + \Delta_{P_C} \quad \text{[Equation 6]}$$

In Equation 6, $\Delta_{P_C}$ may mean the value of the power ratio information Delta_Pc configured in 1705. The power ratio information Delta_Pc 1705 may be configured as any one of values of α to β. As example of α and β, an eNB may set irregular values like α=−8 dB and β=15 dB. As another example, an eNB may set an equal value like α=−6 dB and β=6 dB.

In the present embodiment, since the power information Pc of each CSI-RS resource is notified by a CSI process configuration, CSI-RS configuration information (CSI-RS configuration) 1706 may not include information about power information Pc.

In the present embodiment, a UE may generate CSI based on the power information Pc configured in 1704, and may adjust the gain of each CSI-RS port with reference to the power ratio information 1705 upon performing the channel measurement.

In FIG. 17, the tenth embodiment has been described based on a configuration method, such as FIG. 14 of the sixth embodiment, but is not limited thereto and may be applied based on the various methods described in the sixth embodiment, such as FIG. 13.

Eleventh Embodiment

In the eleventh embodiment, a method of restricting a CSI-RS resource unit for a CMR is described.

In the eleventh embodiment, an eNB may restrict the smallest size of each CSI-RS resource included in a CMR in order to guarantee CSI-RS power boosting of a specific level or more regardless of a CSI-RS resource configuration. For example, if the size of the smallest CSI-RS resource is restricted to 4, CSI-RS power boosting of the smallest 3 dB is made possible. The size of the smallest CSI-RS resource may be determined to be 4 or 8 by a higher layer. In this case, the number of CSI-RS ports actually transmitted may be smaller than or identical with the size of the smallest CSI-RS resource.

Furthermore, an eNB may perform partial muting on a configured CSI-RS for the same purpose. In the eleventh embodiment, if the size of the smallest CSI-RS resource is restricted to 4, the type of available CSI-RS resource size combinations is as follows.

[1] With 2 CSI-RS configurations: (4, 4), (4, 8), (8, 8)
[2] With 3 CSI-RS configurations: (4, 4, 4), (4, 4, 8), (4, 8, 8), (8, 8, 8)
[3] With 4 CSI-RS configurations: (4, 4, 4, 4), (4, 4, 4, 8), (4, 4, 8, 8), (4, 8, 8, 8), (8, 8, 8, 8)

The eleventh embodiment does not need to be essentially performed independently, and may be performed along with the seventh embodiment to the tenth embodiment in order to secure the smallest CSI-RS power boosting level and to limit CMR configuration complexity.

Twelfth Embodiment

In the twelfth embodiment, a method of generating CSI based on multi-Pc or Delta_Pc is described.

As described several times in the above embodiments, although a plurality of types of transmission power Pc has been configured in a UE, that is, although a power boosting level is different for each CSI-RS, the UE may receive a reference point from an eNB, may adjust a measurement gain for each CSI-RS port, and may generate CSI. In order to clarify the process of generating CSI and to reduce a performance difference according to a UE implementation, a power correction matrix P, such as Equation 7, may be introduced.

$$\begin{bmatrix} y^{(15)}(i) \\ \ldots \\ y^{(14+P)}(i) \end{bmatrix} = PW(i) \begin{bmatrix} x^{(0)}(i) \\ \ldots \\ x^{(v-1)}(i) \end{bmatrix}$$ [Equation 7]

In Equation 7, a power correction matrix P is a total number of CSI-RS ports included in a CMR, and v is the number of layers. $[y^{(15)}(i) \ldots y^{(14+P)}(i)]^T$ is a signal transmitted by an antenna port $\{15, \ldots, 14+P\}$, $x^{(v)}(i)$ is a symbol transmitted in a v-th layer, and W(i) is a precoding matrix corresponding to a reported PMI. The power correction matrix P may be computed as in Equation 8.

$$P = diag\left\{10^{\frac{-\beta_1}{10}}, 10^{\frac{-\beta_2}{10}}, \ldots, 10^{\frac{-\beta_P}{10}}\right\}$$ [Equation 8]

In Equation 8, $\beta_i$ is the power correction factor of an i-th port.

Figure 18:
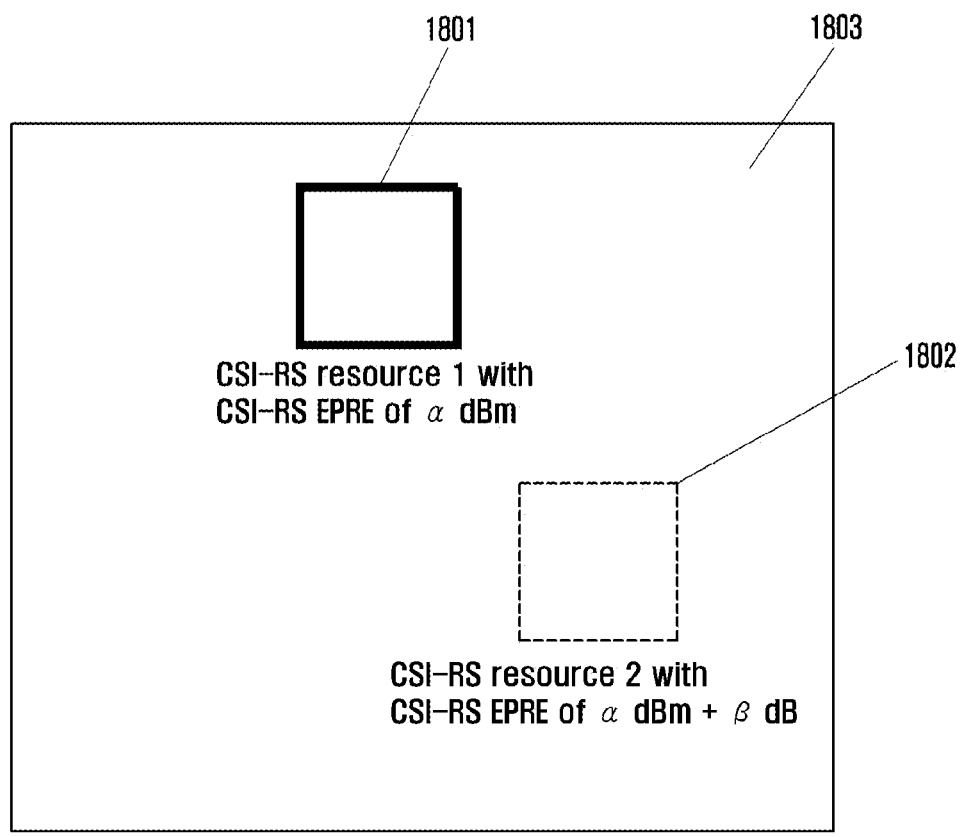
FIG. 18 is a diagram showing an example of a CMR configuration.

FIG. 18 is a diagram showing an example of a CMR configuration.

Referring to FIG. 18, two CSI-RS resources 1801 and 1802 may configure one CMR.

It is assumed that CSI-RS EPRE in the CSI-RS resource 1 (1801) is α dBm and CSI-RS EPRE in the CSI-RS resource 2 (1802) is β dB higher than the EPRE in 1401. In this case, if a configuration, such as the example of the tenth embodiment, is applied, the power ratio information Delta_Pc for the CSI-RS resource 2 configured as 1705 of FIG. 17 becomes β. In this case, power correction factors for the CSI-RS ports of the CSI-RS resource 1 may become $\beta_1 = \beta_2 = \ldots = \beta_{P_1} = 0$ because a UE may generate CSI based on the CSI-RS EPRE of the CSI-RS resource 1. In this case, $P_1$ is the number of CSI-RS ports included in the CSI-RS resource 1. In contrast, regarding the EPRE of CSI-RS ports of the CSI-RS resource 2, the UE may generate CSI by applying power correction factors of $\beta_{P_1+1} = \beta_{P_1+2} = \ldots = \beta_P = \beta$ because the EPRE of CSI-RS ports of the CSI-RS resource 2 is β dB higher than the CSI-RS EPRE of the CSI-RS resource 1.

The above example has been described based on the example of the tenth embodiment, but is not limited thereto. It is evident that the above example may be applied to the aforementioned various embodiments in a similar way.

A UE may compute a CQI by substituting P obtained through the processed into Equation 7, assuming that all of CSI-RS ports included in a CMR have the same EPRE.

Figure 19:
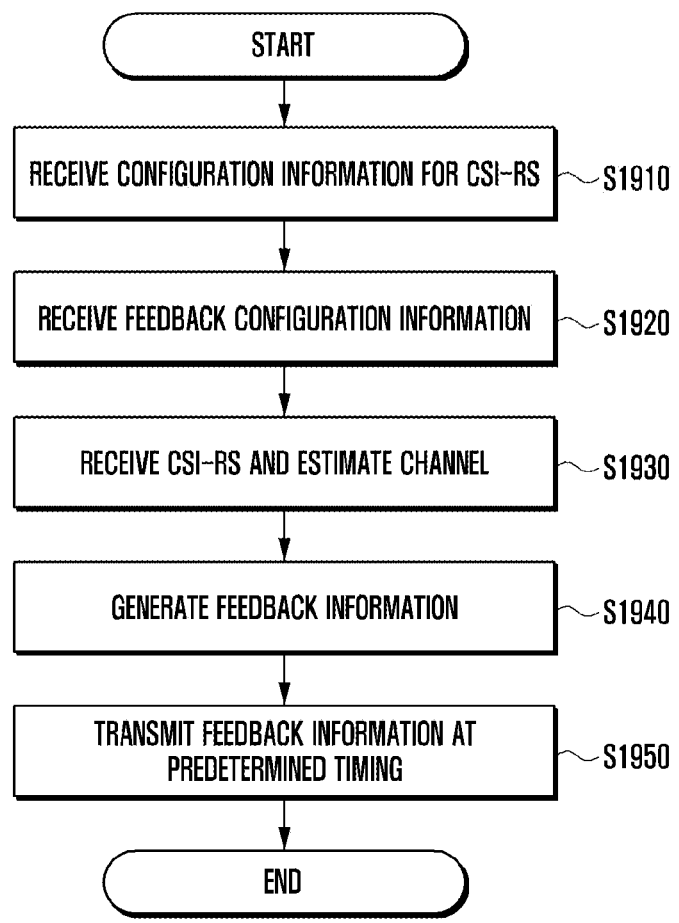
FIG. 19 is a flowchart showing the operating sequence of a UE according to an embodiment of the present disclosure.

FIG. 19 is a flowchart showing the operating sequence of a UE according to an embodiment of the present disclosure.

Referring to FIG. 19, a UE receives configuration information for a CSI-RS configuration at step S1910.

The configuration information for the CSI-RS configuration may be the aforementioned CMR including a plurality of pieces of CSI-RS resource configuration information. The UE may identify at least one of the number of ports for each CSI-RS configuration, timing and resource location in which each CSI-RS is transmitted, and transmission power information based on the received configuration information.

The transmission power information may include the difference in the transmission power between CSI-RSs and a transmission power ratio between a PDSCH and a representative CSI-RS. The UE may identify at least one of the total number of ports for a CMR, timing and resource location in which each CSI-RS is transmitted, and transmission power information based on the configuration information.

Thereafter, at step S1920, the UE may receive a piece of feedback configuration information based on at least one CSI-RS.

At step S1930, when the CSI-RS is received, the UE may estimate a channel between an eNB antenna and the reception antenna of the UE based on the CSI-RS. When the UE estimates a channel at step S1930, the UE may estimate a channel with reference to the difference in the transmission power between CSI-RSs explicitly or implicitly included in the CMR configuration information.

At step S1940, the UE may generate a feedback information rank, a PMI and a CQI using a received feedback configuration and the defined codebook based on the estimated channel and a virtual channel added between CSI-RSs.

Thereafter, at step S1950, the UE completes a channel feedback generation and report process in which a two-dimensional array has been taken into consideration by transmitting pieces of feedback information to the eNB at predetermined feedback timing according to the feedback configuration of the eNB.

Figure 20:
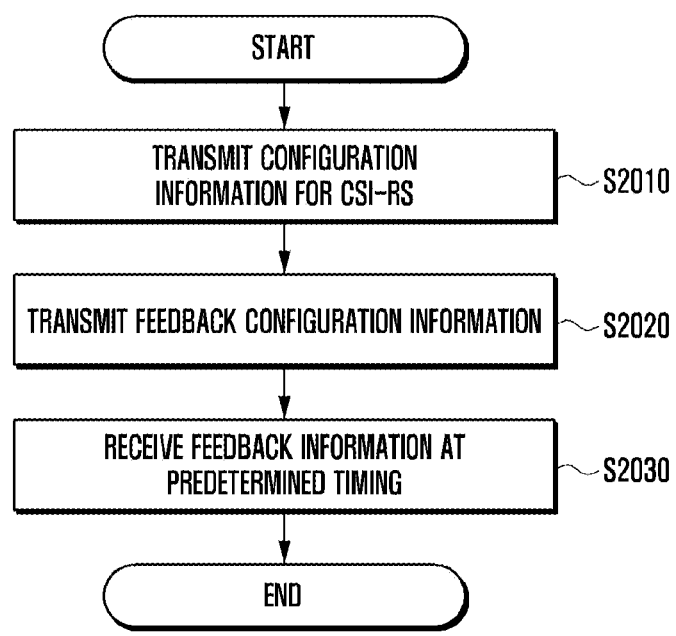
FIG. 20 is a flowchart showing the operating sequence of an eNB according to an embodiment of the present disclosure.

FIG. 20 is a flowchart showing the operating sequence of an eNB according to an embodiment of the present disclosure.

Referring to FIG. 20, at step S2010, the eNB may transmit configuration information for a CSI-RS for measuring a channel to a UE.

The configuration information for the CSI-RS configuration may be the aforementioned CMR including a plurality of pieces of CSI-RS resource configuration information. The CMR configuration information may include at least one of the number of ports for one or more CSI-RS resources, timing and resource location in which each CSI-RS is transmitted, and transmission power information. The transmission power information may include the difference in the transmission power between CSI-RSs and a transmission power ratio between a PDSCH and a representative CSI-RS.

A detailed method for the eNB to configure the transmission power information has been described above and is omitted hereinafter.

Thereafter, at step S2020, the eNB may transmit feedback configuration information based on at least one CSI-RS to a UE. Thereafter, the eNB transmits CSI-RSs corresponding to the configured CMR to the UE. Accordingly, the UE determines feedback based on the CMR configuration information, generates a PMI, RI and CQI corresponding to the feedback, and transmits the PMI, RI and CQI to the eNB.

Accordingly, at step S2030, the eNB receives feedback information from the UE at predetermined timing, and uses the received feedback information to determine a channel state between the UE and the eNB.

Figure 21:
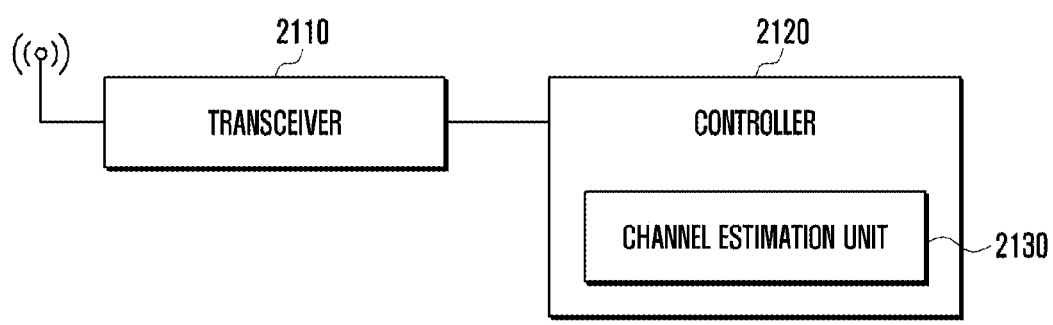
FIG. 21 is a block diagram showing the internal structure of a UE according to an embodiment of the present disclosure.

FIG. 21 is a block diagram showing the internal structure of a UE according to an embodiment of the present disclosure.

Referring to FIG. 21, the UE may include a transceiver 2110 and a controller 2120.

The transceiver 2110 may perform a function for transmitting or receiving data or a signal from another network entity (e.g., an eNB). In this case, the transceiver 2110 may receive configuration information from the eNB and transmit feedback information to the eNB under the control of the controller 2120.

The controller 2120 may control the state and operation of all of configuration elements that form the UE. Specifically, the controller 2120 may generate feedback information based on information allocated by an eNB. Furthermore, the controller 2120 may control the transceiver unit 2110 so that generated channel information is fed back to the eNB based on timing information allocated by the eNB.

To this end, the controller 2120 may include a channel estimation unit 2130. The channel estimation unit 2130 may determine required feedback information through a CMR and feedback allocation information received from an eNB, and may estimate a channel using a received CSI-RS based on the CMR and feedback information.

Specifically, the controller 2120 may perform control so that configuration information is received from an eNB. The configuration information may include a CSI process including a plurality of pieces of CSI-RS configuration information. Furthermore, the configuration information may include power information, that is, information related to power used for an eNB to transmit a CSI-RS. In this case, the configuration information may include a plurality of pieces of CSI-RS configuration information, and may also include a plurality of pieces of power information. Alternatively, the configuration information includes power information and power ratio information, and thus the power information for plurality of pieces of CSI-RS configuration information may be transmitted to a UE.

A detailed method thereof has been described above, and thus is omitted.

In FIG. 21, an example in which the UE includes the transceiver unit 2110 and the controller 2120 has been described, but the UE is not limited thereto and may further include various elements depending on the function performed by the UE. For example, the UE may further include a display unit displaying the current state of the UE, an input unit receiving a signal, such as the execution of a function, from a user, a memory storing data generated by the UE, etc.

Furthermore, in the above example, the channel estimation unit 2130 has been illustrated as being included in the controller 2120, but is not necessarily limited thereto. The controller 2120 may control the transceiver unit 2110 so that it receives configuration information for each of one or more reference signal resources from an eNB. Furthermore, the controller 2120 may measure the one or more reference signals and control the transceiver unit 2110 so that it receives feedback configuration information for generating feedback information according to the results of the measurement from the eNB.

Furthermore, the controller 2120 may measure at least one reference signal received through the transceiver unit 2110, and may generate feedback information based on the feedback configuration information. Furthermore, the controller 2120 may control the transceiver unit 2110 so that it transmits the generated feedback information to an eNB at feedback timing according to the feedback configuration information. Furthermore, the controller 2120 may receive CMR configuration information from the eNB, and may receive each CSI-RS for configuring a CMR from the received CMR configuration information. The UE may adjust a channel estimation value based on a received CSI-RS and the CMR configuration information and generate feedback information based on the adjusted channel estimation value. Furthermore, the UE may transmit the generated feedback information to the eNB.

Furthermore, the controller 2120 may receive a CSI-RS from an eNB, may generate feedback information based on the received CSI-RS, and may transmit the generated feedback information to the eNB. In this case, the controller 2120 may select one precoding matrix for all of the antenna port groups of the eNB. Furthermore, the controller 2120 may receive feedback configuration information from an eNB, may receive a CSI-RS from the eNB, may generate feedback information based on the received feedback configuration information and the received CSI-RS, and may transmit the generated feedback information to the eNB. In this case, the controller 2120 may receive additional feedback configuration information based on the relation between feedback configuration information corresponding to each antenna port group of the eNB and the antenna port group.

In addition, the controller 2120 may control the aforementioned operation of the UE.

Figure 22:
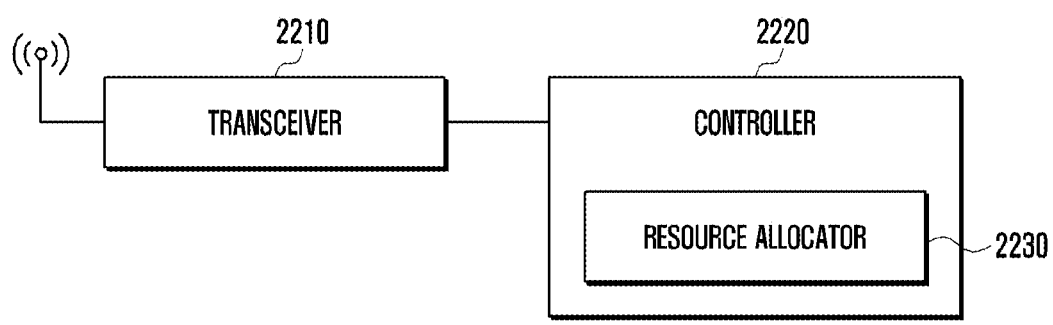
FIG. 22 is a block diagram showing the internal structure of an eNB according to an embodiment of the present disclosure.

FIG. 22 is a block diagram showing the internal structure of an eNB according to an embodiment of the present disclosure.

Referring to FIG. 22, the eNB may include a transceiver 2210 and a controller 2220.

The transceiver 2210 may transmit or receive a signal to or from another network entity. The transceiver 2220 may perform a function for transmitting/receiving data, a reference signal and feedback information to a UE. In this case, the transceiver unit 2210 may transmit a CSI-RS to the UE through allocated resources and receive feedback for CSI from the UE under the control of the controller 2220.

The controller 2220 may control the state and operation of all of the elements that form the eNB. Specifically, the controller 2220 may allocate a CSI-RS resource for the channel estimation of a UE to the UE and allocate feedback resources and feedback timing to the UE.

Specifically, the controller 2220 may perform control so that configuration information for allocating CSI-RS resources and feedback resource to a UE is transmitted. The configuration information may include a CSI process including a plurality of pieces of CSI-RS configuration information. Furthermore, the configuration information may include power information, that is, information related to power used for the eNB to transmit a CSI-RS. In this case, the configuration information may include a plurality of pieces of CSI-RS configuration information and may also include a plurality of pieces of power information. Alternatively, the configuration information includes power information and power ratio information, and thus the power information for a plurality of pieces of CSI-RS configuration information may be transmitted to a UE.

A detailed method for this has been described above and thus is omitted hereinafter.

To this end, the controller 2220 may further include a resource allocator 2230. Furthermore, the controller 2220 may allocate a feedback configuration and feedback timing so that pieces of feedback from several UEs do not collide against each other, may receive feedback information configured in corresponding timing, and may analyze the received feedback information. The resource allocator 2230 has been illustrated as being included in the controller 2220, but is not necessarily limited thereto. The controller 2220 may control the transceiver unit 2210 so that it transmits configuration information for each of at least one reference signal to a UE or may generate the at least one reference signal. Furthermore, the controller 2220 may control the transceiver 2220 so that it transmits feedback configuration information for generating feedback information according to the results of measurement to the UE. Furthermore, the controller 2220 may control the transceiver 2220 so that it transmits the at least one reference signal to the UE and receives feedback information from the UE at feedback timing according to the feedback configuration information. Furthermore, the controller 2220 may transmit feedback configuration information to the UE, may transmit a CSI-RS to the UE, and may receive feedback information, generated based on the feedback configuration information and the CSI-RS, from the UE. In this case, the controller 2220 may transmit additional feedback configuration information based on the relation between feedback configuration information corresponding to each antenna port group of the eNB and the antenna port group. Furthermore, the controller 2220 may transmit a beamformed CSI-RS to the UE based on the feedback information, and may receive feedback information generated based on the CSI-RS from the UE.

In accordance with the aforementioned embodiment of the present disclosure, an eNB may configure one or more CSI-RS resources based on the number of TXRUs to be driven by the eNB or other communication conditions. A UE may measure channel quality of a data channel using at least one of the configured CSI-RS resources. Furthermore, the UE can improve CQI accuracy and reduce additional processing in the eNB for reported CSI by effectively generating CSI based on the configuration of the eNB.

Meanwhile, the asynchronous cellular mobile communication standard organization 3GPP (3$^{rd}$ generation partnership project) adopted a technology for extending a bandwidth in order to improve the data transfer rate in long term evolution (LTE) Release 10 standard in the past. The technology is a carrier aggregation (CA) in which up to 5 component carriers (CCs) can be used in each of the downlink and uplink. Accordingly, the current LTE system can extend a bandwidth and increase the data transfer rate compared LTE Release 8 and 9 in which only one CC was used in each of the downlink and uplink. In this case, a downlink component carrier (DL CC) and an uplink component carrier (UL CC) are aggregated and called a cell. The connection relation between the DL CC and the UL CC may be configured by a system information block (SIB). For example, the connection relation between the DL CC and the UL CC may be configured by the SIB2. An LTE UE supporting a CA may transmit and receive downlink and uplink data through a plurality of serving cells. In the current 3GPP, in LTE Release 13 that is being standardized, a technology for further extending the CA is discussed. In this case, the CA is further extended so that a maximum of 32 serving cells including an unlicensed band can be used in LTE.

In LTE, a frequency domain resource allocator is a resource block (RB), and the RB includes 12 contiguous subcarriers of a 15 kHz interval and may have the size of 180 kHz. Furthermore, a time domain resource allocator is a subframe having a length of 1 ms, and 10 subframes may form one radio frame. Furthermore, one radio frame may correspond to one system frame number (SFN). Finally, one subframe may include two slots (a No. 0 slot and a No. 1 slot), each having a length of 0.5 ms. If a normal subframe is assumed, each slot may include 7 orthogonal frequency division multiple (OFDM) symbols in the case of the downlink and may include 7 single carrier frequency division multiple access (SC-FDMA) symbols in the case of the uplink. In the LTE system, the smallest transmitter of common data may be determined for each resource block (RB) within one subframe. The number of RBs is proportional to the bandwidth of a system transmission band. If a modulation and coding scheme (MCS) is the same, the data transfer rate of a UE increases in proportion to the number of RBs allocated to the corresponding UE.

The LTE system defines 6 transmission bandwidths and manages them. In the case of frequency division duplex (FDD) in which the downlink and the uplink are divided by a frequency, a downlink transmission bandwidth and an uplink transmission bandwidth may be different. Table 23 shows the correspondence relation between a transmission bandwidth and channel bandwidth defined in the LTE system. In this case, an NRB indicates the number of RBs. For example, in an LTE system having a 10 MHz channel bandwidth, a transmission bandwidth may include 50 RBs.

TABLE 23

[405]

| | Channel bandwidth BW$_{Channel}$ [MHz] | | | | | |
|---|---|---|---|---|---|---|
| | 1.4 | 3 | 5 | 10 | 15 | 20 |
| Transmission bandwidth configuration N$_{RB}$ | 6 | 15 | 25 | 50 | 75 | 100 |

In the LTE system, a UE may transmit a sounding reference signal (SRS) in the uplink. An eNB may receive the SRS and estimates a channel state in the uplink. The eNB may perform uplink data scheduling for the UE based on the estimation, that is, frequency resource allocation, power control and MCS selection. Furthermore, if the UE supports uplink multiple input multiple output (MIMO), the eNB may select a precoding matrix to be used when the corresponding UE performs MIMO transmission based on the estimation. Furthermore, in the case of time division duplex (TDD), since the same frequency band is used in the downlink and uplink, the eNB may use the channel state estimated by receiving the SRS for downlink data scheduling or for the selection of a precoding matrix to be used upon performing the downlink MIMO transmission.

The SRS may be configured as a constant amplitude zero auto correlation (CAZAC) sequence. A CAZAC sequence has a characteristic in that it has a correlation value 0 with a CAZAC sequence shifted to a different cyclic shift value. Accordingly, although several UEs transmit SRSs in the same frequency domain, the SRSs can be distinguished if an eNB has allocated different CAZAC sequence cyclic shift values to the UEs.

SRS transmission-related parameters are transferred to a UE through higher layer signaling and may be classified into a cell-specific parameter and a UE-specific parameter.

The cell-specific parameters are for a configuration for a subframe in which an SRS can be transmitted. An eNB may notify a UE of a period and offset for each subframe within a radio frame. Accordingly, when UEs perform uplink data transmission, the UEs make empty an SRS symbol transmission location (e.g., the last symbol within a subframe in the case of FDD) in a subframe in which the SRS may be transmitted, thereby being capable of preventing interference from occurring between the SRSs and uplink data of different UEs in an eNB reception stage.

The UE-specific parameters may provide notification of the period and offset in which a UE actually transmits an SRS, frequency resource information of the SRS, an SRS bandwidth, a cyclic shift value, etc. within a subframe in which the cell-specific SRS may be transmitted.

In general, an SRS may be transmitted periodically based on the parameters. Alternatively, an eNB may request aperiodic one-shot SRS transmission from a specific UE through SRS trigger information of a downlink control channel, if necessary. For example, an eNB may request aperiodic SRS transmission from a specific UE by including SRS request information in a DCI transmitted through a downlink control channel and transmitting the DCI to the UE.

In this case, a parameter set that may be used by the UE for the aperiodic SRS transmission has been configured through the higher signaling of the eNB. The eNB may notify the UE that which parameter set will be used through SRS trigger information of a downlink control channel.

Meanwhile, for a CA, an eNB may independently configure SRS transmission parameters for each serving cell. Accordingly, one UE may transmit SRSs through a plurality of UL CCs at the same time. In this case, pieces of SRS transmission power may be equally divided. If one UE performs periodic SRS transmission and aperiodic SRS transmission at the same time in the same serving cell, a problem in that the accuracy of SRS-based channel estimation is greatly deteriorated due to limited transmission power. Accordingly, the corresponding UE may transmit an aperiodic SRS and drop periodic SRS transmission.

Specifically, in Rel-13, if a CA is extended and a maximum of 32 serving cells are supported, one UE may transmit an SRS through a maximum of 32 uplink CCs at the same time. Accordingly, the total number of uplink CCs in which a UE can transmit SRSs at the same time may be greatly increased from up to 5 CCs in the existing CA. Furthermore, the possibility that one UE transmits a plurality of SRSs through several CCS at the same time is also greatly increased. Furthermore, in the current LTE standard, a UE-specific SRS transmission subframe configuration for aperiodic SRS transmission has been defined as 17 types in the case of FDD and as 24 types in the case of TDD. This falls far short of the number of 32 CCs. Accordingly, if the number of CCs used by a UE is many, it is difficult for an eNB to configure a different aperiodic SRS transmission subframe for each CC in order to avoid the SRS simultaneous transmission of the corresponding UE.

Furthermore, a situation in which periodic SRS transmission and aperiodic SRS transmission are simultaneously generated in different uplink CCs with respect to one UE needs to be taken into consideration.

In a CA supporting a maximum of 32 serving cells, when a situation in which transmission power of a UE is limited is taken into consideration, the amount of power that may be allocated to an SRS transmitted in each uplink CC may be greatly reduced compared to the existing CA. This may cause a problem in that the accuracy of SRS-based channel estimation is greatly deteriorated in an eNB reception stage.

Accordingly, the present disclosure provides a method for a UE to transmit an SRS and a method and apparatus for an eNB to receive an SRS, which can maintain SRS-based channel estimation accuracy in an eNB reception stage in a situation in which transmission power of a UE has been limited.

To this end, an eNB may set a maximum number of uplink CCs in which one UE may transmit SRSs at the same time through high signaling. In this case, the maximum number of CCs capable of simultaneous SRS transmission set by the eNB may be a cell-specific value or a UE-specific value. For example, an eNB may set the maximum number of CCS capable of simultaneous SRS transmission as K. If a UE performs SRS simultaneous transmission through L (L>K) CCs, the corresponding UE may drop SRS transmission in (L−K) CCs. A criterion on which the SRS transmission is dropped may comply with a CC priority rule on which a previously defined SRS is transmitted. In this case, a predetermined value instead of a value set by an eNB may be used as a maximum number of CCs in which an SRS can be transmitted at the same time.

As another method, a maximum number of CCs in which one UE may transmit an SRS at the same time may correspond to the greatest transmission power of the corresponding UE in a one-to-one manner. For example, it is assumed that one UE supports the greatest transmission power of X dBm, the other UE supports the greatest transmission power of Y dBm, and X>Y. In this case, the UE supporting the greatest transmission power of X dBm may simultaneously transmit an SRS using a maximum of M CCs, the UE supporting the greatest transmission power of Y dBm may simultaneously transmit an SRS using a maximum of N CCs, and M>N.

As yet another method, a maximum number of CCs in which one UE may simultaneously transmit an SRS may be determined by the greatest transmission power upper limit and lower limit range of a UE set by an eNB.

In accordance with yet another embodiment of the present disclosure, a priority rule when a plurality of SRSs is simultaneously transmitted may be defined, and an SRS transmission UE may sequentially allocate available power to a plurality of SRS transmissions based on priority according to the rule.

Hereinafter, the aforementioned method for a UE to transmit an SRS and the aforementioned method for an eNB to receive an SRS are described in detail.

Figure 23:
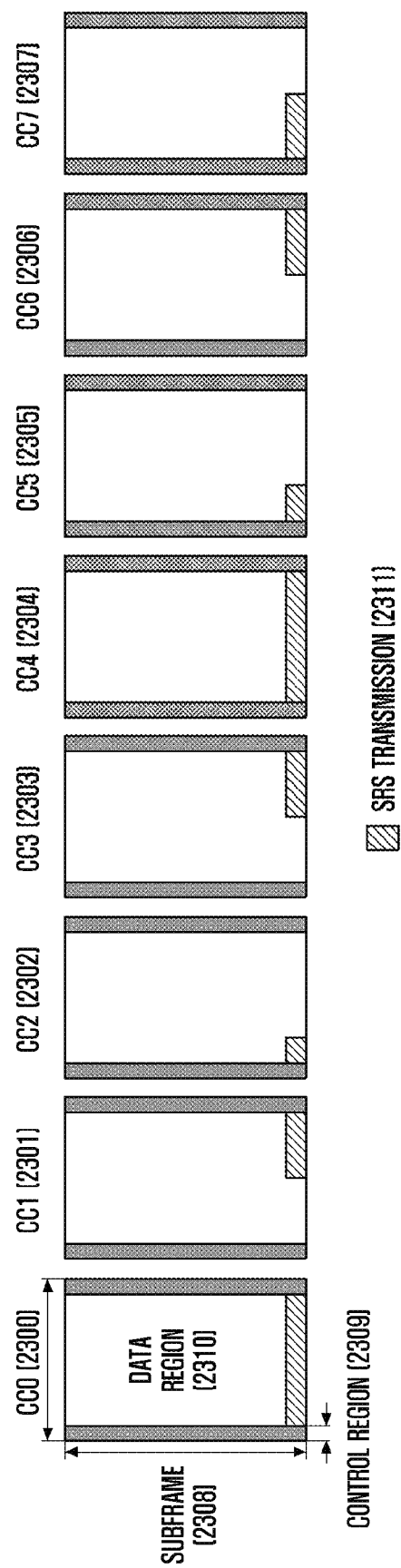
FIG. 23 is a diagram showing a method for a UE to transmit an SRS through a plurality of UL CCs at the same time according to another embodiment of the present disclosure.

FIG. 23 is a diagram showing a method for a UE to transmit an SRS through a plurality of UL CCs at the same time according to another embodiment of the present disclosure.

Referring to FIG. 23, FIG. 23 shows a case where in the case of FDD, the UE simultaneously transmits an SRS through 8 uplink CCs. The 8 uplink CCs may include a CC0

2300, CC1 2301, CC2 2302, CC3 2303, CC4 2304, CC5 2305, CC6 2306 and CC7 2307. Each of the uplink CCs may be divided into a control region 2309 for transmitting uplink control information and a data region 2310 for data transmission with respect to one subframe (2308) time period. In the case of FDD, an SRS may be transmitted in the last single carrier frequency division multiple access (SC-FDMA) symbol, which may be indicated by SRS transmission 2311. In this case, the reason why locations in the SRS bandwidth of the SRS transmission 2311 and a frequency may be different depending on a CC is that an SRS-related configuration may be independently configured for each uplink CC as described above.

Furthermore, although not shown, in the case of TDD, an SRS may be transmitted in an SC-FDMA symbol within the uplink pilot time slot (UpPTS) period of a special subframe between a downlink subframe and an uplink subframe.

A frequency domain available for SRS transmission is the data region 2310 that belongs to an uplink transmission bandwidth and does not include the control region 2309. If one UE needs to simultaneously transmit an SRS in the uplink control channel of the control region 2309 and the data region 2310, the UE may use an uplink control channel format that does not use the last SC-FDMA symbol or may drop SRS transmission and transmit only the uplink control channel depending on an eNB configuration.

As described above, since an SRS-related configuration is independent for each uplink CC, there is a good possibility that one UE simultaneously transmits an SRS in a plurality of UL CCs as in FIG. 23. Furthermore, as the number of SRSs simultaneously transmitted increases as in FIG. 23 in a situation in which transmission power of a UE has been limited, transmission power available for the SRS transmission of each CC is reduced. As a result, the channel estimation accuracy of an SRS received by an eNB may be deteriorated.

Figure 24:
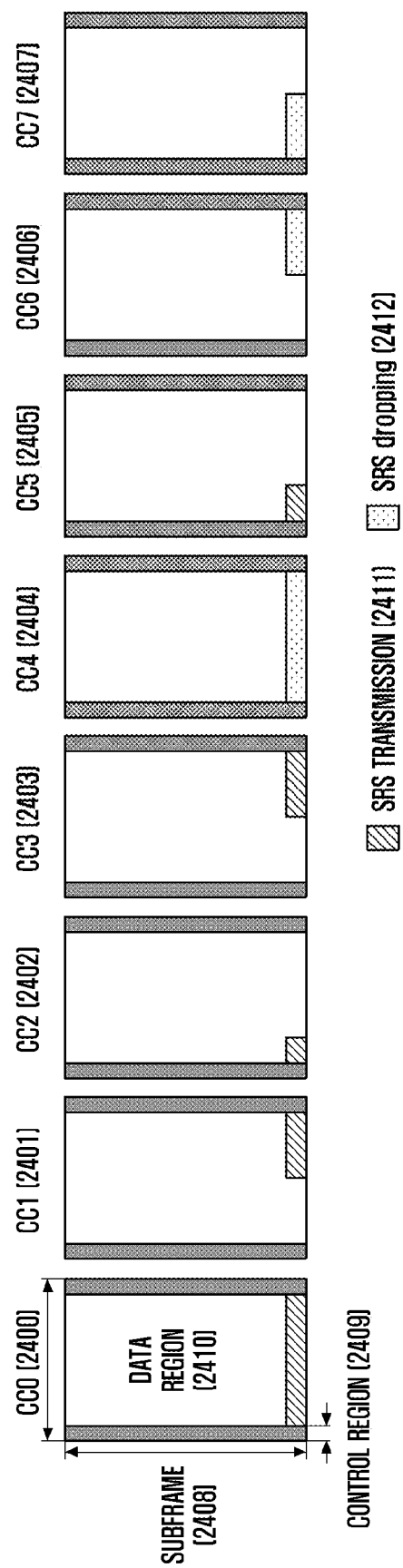
FIG. 24 is a diagram showing a method for a UE to transmit an SRS according to a first method of another embodiment of the present disclosure.

FIG. 24 is a diagram showing a method for a UE to transmit an SRS according to a first method of another embodiment of the present disclosure.

Referring to FIG. 24, FIG. 24 shows a case where on the assumption of FDD, a UE simultaneously transmits an SRS through 8 uplink CCs. It is assumed that a CC0 2400 belongs to a primary cell (PCell). In this case, the PCell may mean the most important serving cell that belongs to serving cells used by the UE and that is related to UE mobility. One PCell of a plurality of serving cells is configured for each UE, and the remaining serving cells may be configured as secondary cells (SCells) from the point of view of the corresponding UE.

In accordance with a first method, an eNB may configure a maximum number of uplink CCs in which one UE may simultaneously transmit an SRS through higher signaling. In this case, the maximum number of CCs capable of SRS simultaneous transmission configured by the eNB may be a cell-specific value or a UE-specific value. In the first method, it is assumed that the maximum number of CCs capable of SRS simultaneous transmission of the UE set by the eNB is 5 and the corresponding UE simultaneously transmits an SRS through the 8 CCs. However, the range of right of the present disclosure is not limited thereto, and an eNB may configure a maximum number of CCs in which an SRS may be transmitted based on the greatest transmission power of a UE, the number of serving cells which may be configured in a UE, etc.

In the present disclosure, the corresponding UE may drop (2412) 3 of the 8 CCs for SRS transmission. In this case, the UE may drop the SRS transmission of a specific CC according to priority.

For example, the UE may drop an SRS transmission CC from an SRS transmission CC having the lowest priority based on the following priority rule.

First, an SRS transmitted in the PCell may have the highest priority. The reason for this is that the PCell is the most important cell related to UE mobility.

Next, in the same condition, an aperiodic SRS may have higher priority than a periodic SRS. The reason for this is that in the case of an aperiodic SRS, an eNB requests SRS transmission from a UE by transmitting DCI through a downlink control channel under the necessity.

Next, in the same condition, an SRS having a long period may have higher priority than an SRS having a short period. The reason for this is that an SRS having a long period may be transmitted after a relatively long time if it is not transmitted at this point in time.

Finally, in the same condition, an SRS having a small bandwidth may have higher priority than an SRS having a great bandwidth. The reason for this is that an SRS having a great bandwidth consumes more transmission power and can cover an uplink sounding band by a small number of transmissions compared to an SRS having a small bandwidth.

As another method, a UE may apply different priority rules to an aperiodic SRS and a periodic SRS.

For example, in the same condition, in priority between aperiodic SRSs, an SRS having a great bandwidth may have higher priority than an SRS having a small bandwidth. In priority between periodic SRSs, an SRS having a small bandwidth may have higher priority than an SRS having a great bandwidth. The reason for this is that it may be preferred that channel estimation is performed on a frequency band of a wide range as far as possible because an aperiodic SRS is transmitted once according to the needs of an eNB. Furthermore, the reason for this is that it may be preferred that precise channel estimation is performed through an SRS of a small bandwidth although some time is taken because a periodic SRS will continue to be transmitted. The reason for this is that if the same power is used, SRS power density of a small bandwidth is higher than SRS power density of a great bandwidth.

The priority rule is one example. An actual priority rule may be configured to include at least one of the aforementioned conditions. Furthermore, the priority rule may be transmitted from an eNB to a UE through higher layer signaling or may have been previously stored in an eNB and a UE.

An eNB configures the number of CCs in which an SRS can be simultaneously transmitted in a UE through the aforementioned method. Accordingly, the deterioration of SRS-based channel estimation accuracy in an eNB reception stage when transmission power of a UE is limited, and an eNB can be aware that each UE has dropped the SRS transmission of which CC because SRS transmission exceeding a preset number is dropped by applying an agreed priority rule. As a result, there is no problem in that a false operation of performing channel estimation on an SRS not transmitted by an eNB reception stage is generated. Alternatively, a UE may apply a predetermined value instead of an eNB set value as maximum number of CCs in which an SRS may be simultaneously transmitted.

As another method, a maximum number of CCs in which a UE may simultaneously transmit an SRS may correspond to the greatest transmission power of the corresponding UE in a one-to-one manner. For example, it is assumed that one UE supports the greatest transmission power of X dBm, the other UE supports the greatest transmission power of Y dBm, and X>Y. In this case, the UE supporting the greatest transmission power of X dBm may simultaneously transmit an SRS through a maximum of M CCs, the UE supporting the greatest transmission power of Y dBm may simultaneously transmit an SRS through a maximum of N CCs, and M>N. Alternatively, a maximum number of CCs in which a UE may simultaneously transmit an SRS may be determined by the greatest transmission power upper limit and lower limit range of a UE set by an eNB. The rule may have been previously agreed, and thus an eNB can be aware that each UE has dropped the SRS transmission of which CC.

Figure 25:
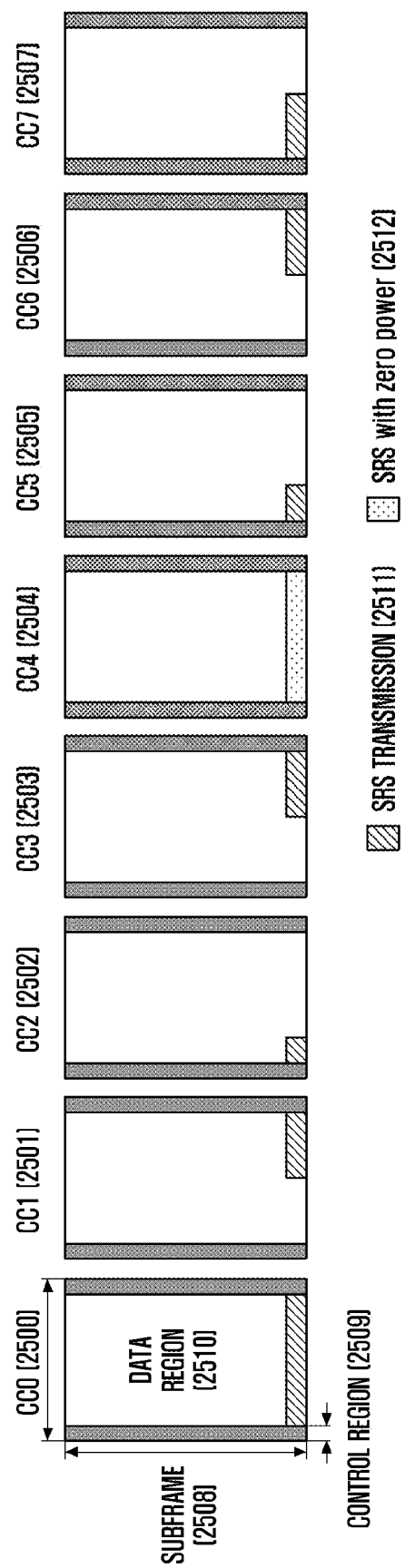
FIG. 25 is a diagram showing a method for a UE to transmit an SRS according to a second method of another embodiment of the present disclosure.

FIG. 25 is a diagram showing a method for a UE to transmit an SRS according to a second method of another embodiment of the present disclosure.

Referring to FIG. 25, FIG. 25 shows a case where on the assumption of FDD, a UE simultaneously transmits an SRS through 8 uplink CCs.

It is assumed that a CC0 2500 belongs to a PCell. In accordance with the second method, a UE may sequentially allocate available power to SRSs simultaneously transmitted in CCs according to a previously agreed priority rule. In this case, the aforementioned rule of the first method may be applied as the previously agreed priority rule. An actual priority rule may be configured to include at least one of the conditions described in the first method. The priority rule of the second method and the priority rule of the first embodiment may not be the same.

In this case, in accordance with the second method, a zero power SRS 2512 that belongs to SRSs having low priority and to which transmission power has not been allocated may be present. In this case, an eNB reception stage is unaware of whether zero power has been applied to the corresponding SRS 2512, and may perform channel estimation on the corresponding SRS 2512 assuming that the SRS has been transmitted by a corresponding UE because the eNB has configured SRS transmission in the UE. As a result, the eNB may perform unnecessary and inaccurate channel estimation.

In order to reduce such a problem, in the second method, an eNB may not perform channel estimation on P SRSs having the lowest priority. The reason for this is that there is a good possibility that SRSs having low priority may become a zero power situation or may be transmitted with very low power because the latest power is applied to the SRSs.

The P value may include a predetermined value. For example, the P value may be randomly determined by a service provider or may be determined depending on the greatest transmission power of a UE in which the P value is set. That is, a smaller P value may be set as the greatest transmission power of a UE becomes higher.

Figure 26:
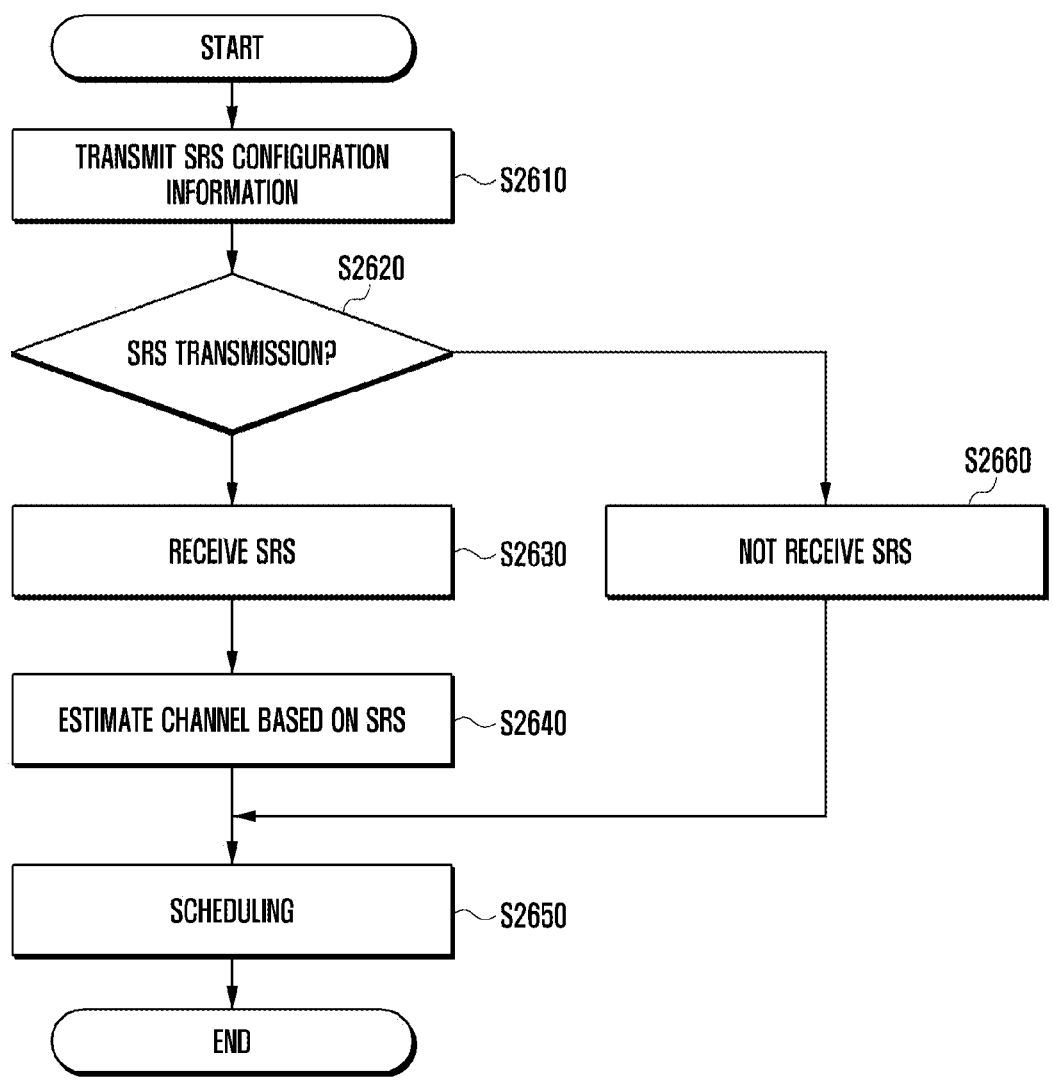
FIG. 26 is a diagram showing the operating procedure of an eNB according to a first method of the present disclosure.

FIG. 26 is a diagram showing the operating procedure of an eNB according to a first method of the present disclosure.

Referring to FIG. 26, the eNB may transmit SRS configuration information to UEs at step S2610. The eNB may transmit the SRS configuration information to the UE through higher layer signaling (e.g., RRC signaling).

The SRS configuration information may include at least one of the aforementioned cell-specific SRS configuration information and UE-specific SRS configuration information. That is, the SRS configuration information may include at least one of period and offset information in which an SRS may be transmitted for each subframe within a radio frame and transmission period and offset information of an SRS within a subframe in which an SRS may be transmitted.

Furthermore, the SRS configuration information may include at least one of a maximum number of CCs in which an SRS may be transmitted and SRS drop-related configuration information.

The cell-specific SRS configuration information and the UE-specific SRS configuration information may be included in the same message as the maximum number of CCs in which an SRS may be transmitted and the SRS drop-related configuration information and transmitted, or may be included in two messages, respectively, and transmitted to each UE.

Thereafter, at step S2620, the eNB may determine whether an SRS has been transmitted by each UE. In this case, the eNB may determine whether an SRS has been transmitted by each UE based on a previously stored SRS priority rule and configuration information transmitted to the UE. Specifically, the eNB may determine a CC in which an SRS may be transmitted and a CC in which an SRS may be dropped based on a maximum number of transmittable CCs included in the configuration information transmitted to the UE and the SRS priority rule.

If it is determined that an SRS has been transmitted in some CCs by a specific UE, the eNB proceeds to step S2630 and may attempt to receive the SRSs of the corresponding CCs.

The eNB that has received the SRSs may perform channel estimation based on the received SRSs at step S2640.

Furthermore, at step S2650, the eNB may perform data scheduling on a corresponding UE based on the results of the channel estimation.

That is, the eNB may transmit two or more types of configuration information to the UE, may receive an SRS based on a maximum number of CCs that belong to the transmitted configuration information and in which an SRS may be transmitted, and may perform channel estimation based on the received SRS.

Meanwhile, if it is determined that an SRS has not been transmitted by a specific UE, the eNB may proceed to step S2660 and may not attempt SRS reception in a corresponding CC. Accordingly, the eNB does not receive an SRS and may schedule a UE at step S2650.

Figure 27:
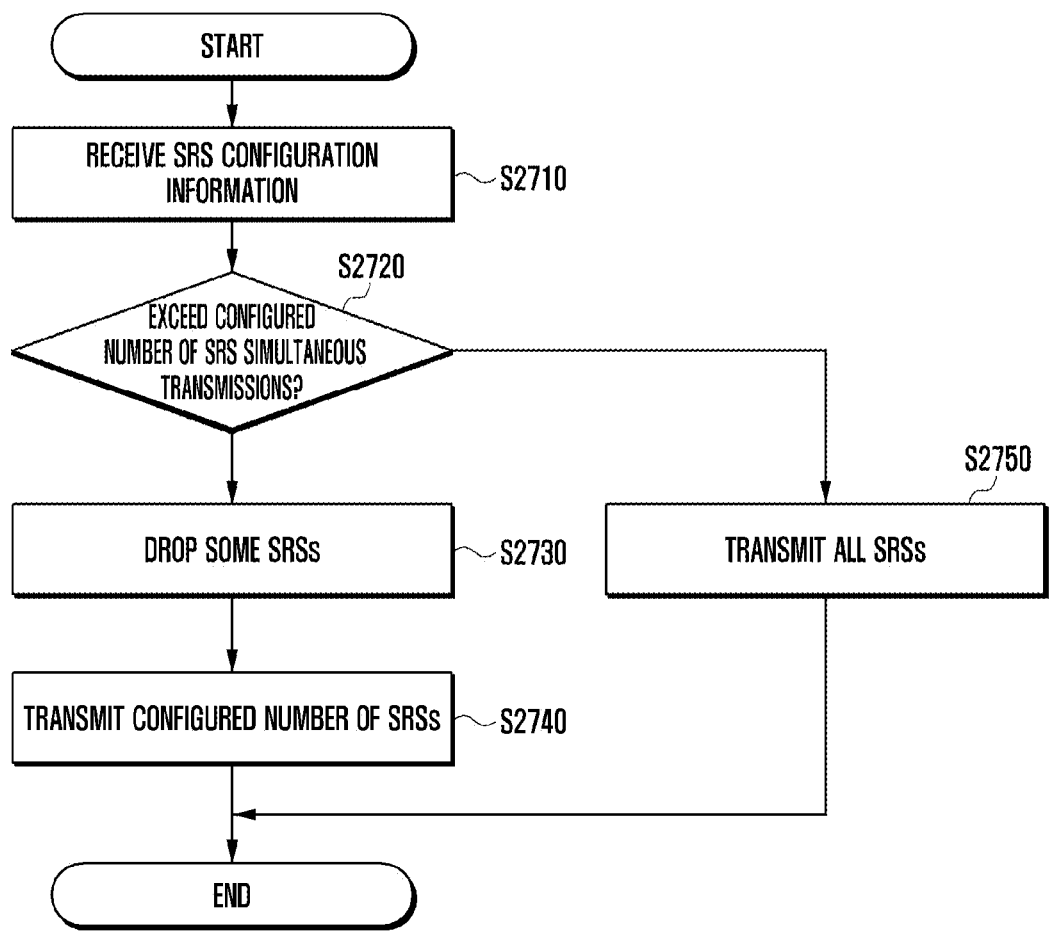
FIG. 27 is a diagram showing the operating procedure of a UE according to a first method of the present disclosure.

FIG. 27 is a diagram showing the operating procedure of a UE according to a first method of the present disclosure.

Referring to FIG. 27, the UE may receive SRS configuration information from an eNB at step S2710. The UE may receive the SRS configuration information through higher layer signaling (e.g., RRC signaling).

The SRS configuration information may include at least one of the aforementioned cell-specific SRS configuration information and UE-specific SRS configuration information. That is, the SRS configuration information may include at least one of period and offset information in which an SRS may be transmitted for each subframe within a radio frame and transmission period and offset information of an SRS within a subframe in which an SRS may be transmitted.

Furthermore, the SRS configuration information may include at least one of a maximum number of CCs in which an SRS may be transmitted and SRS drop-related configuration information.

The cell-specific SRS configuration information and UE-specific SRS configuration information, and the maximum number of CCs in which an SRS may be transmitted and SRS drop-related configuration information may be included in one message and transmitted or may be included in two messages, respectively, and transmitted.

Thereafter, at step S2720, the UE may determine whether the number of CCs in which the corresponding UE currently simultaneously transmit an SRS exceeds a maximum number of CCs received through the SRS configuration information.

If the number of CCs in which an SRS is simultaneously transmitted exceeds the maximum number of CCs, the UE may transmit an SRS based on the aforementioned SRS priority rule and the received configuration information at step S2730. That is, the UE may drop some SRS that do not satisfy conditions based on the SRS priority rule and the maximum number of CCs in which an SRS may be transmitted.

Thereafter, at step S2740, the UE may simultaneously transmit an SRS in CCs configured to a maximum extent.

That is, the UE may receive two or more types of configuration information, and may transmit an SRS based on a maximum number of CCs that belongs to the received configuration information and in which an SRS may be transmitted.

If the number of CCs in which an SRS is simultaneously transmitted does not exceed the maximum number of CCs, the UE proceeds to step S2750 and may simultaneously transmit all of SRSs. In this case, transmission power may be allocated to the SRSs at an equal ratio.

As described above, the present disclosure can prevent the deterioration of SRS-based channel estimation accuracy in an eNB reception stage in a situation in which transmission power of a UE is limited by limiting the number of CCs in which an SRS may be simultaneously transmitted. Furthermore, an eNB can be aware that each UE has dropped the SRS transmission of which CC because an SRS transmission CC exceeding a limited number is dropped by applying the priority rule of a CC on which an SRS is transmitted. Accordingly, a false operation for an eNB reception stage to perform channel estimation on an SRS that has not been transmitted can be prevented.

Figure 28:
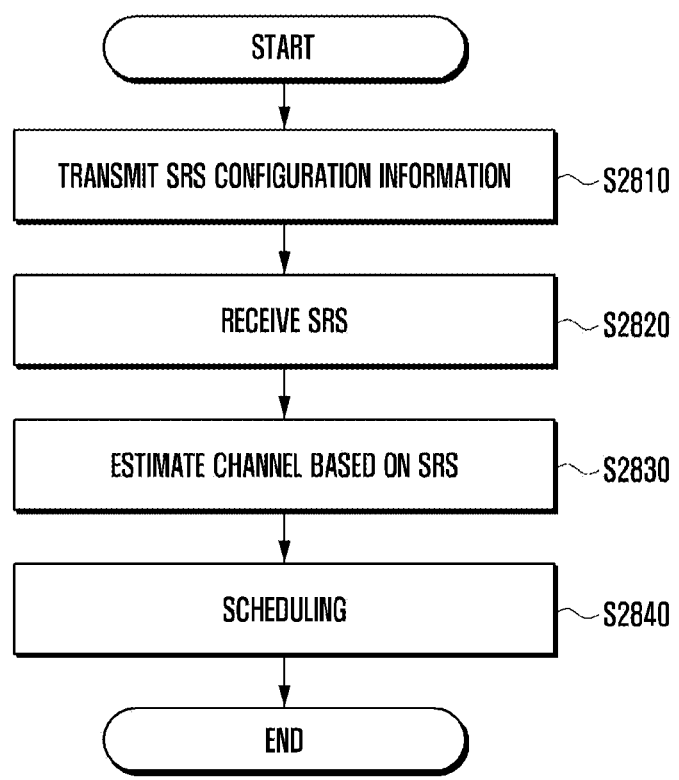
FIG. 28 is a diagram showing the operating procedure of an eNB according to a second method of the present disclosure.

FIG. 28 is a diagram showing the operating procedure of an eNB according to a second method of the present disclosure.

Referring to FIG. 28, at step S2810, the eNB may transmit SRS configuration information to UEs. The eNB may transmit the SRS configuration information to the UEs through higher layer signaling (e.g., RRC signaling).

The SRS configuration information may include at least one of the aforementioned cell-specific SRS configuration information and UE-specific SRS configuration information. That is, the SRS configuration information may include at least one of period and offset information in which an SRS may be transmitted for each subframe within a radio frame and transmission period and offset information of an SRS within a subframe in which an SRS may be transmitted.

Furthermore, the SRS configuration information may include at least one of a maximum number of CCs in which an SRS may be transmitted and SRS drop-related configuration information.

The cell-specific SRS configuration information and UE-specific SRS configuration information, and the maximum number of CCs in which an SRS may be transmitted and the SRS drop-related configuration information may be included in one piece of configuration information and transmitted or may be included in two messages and transmitted to each UE.

Thereafter, at step S2820, the eNB may attempt SRS reception for CCs in which SRS transmission has been configured by the eNB.

Thereafter, at step S2830, the eNB may perform channel estimation on a corresponding CC based on a received SRS.

However, a zero power SRS that belongs to SRSs having low priority and to which transmission power has not been allocated may be present. In this case, the eNB may not be unaware of whether a corresponding SRS is a zero power SRS. Accordingly, the eNB may not perform channel estimation on a predetermined number of SRSs based on the aforementioned priority rule. That is, the eNB may not perform channel estimation on a predetermined number of SRSs having the lowest priority.

Furthermore, at step S2840, the eNB may perform an operation, such as data scheduling, on a corresponding UE.

Figure 29:
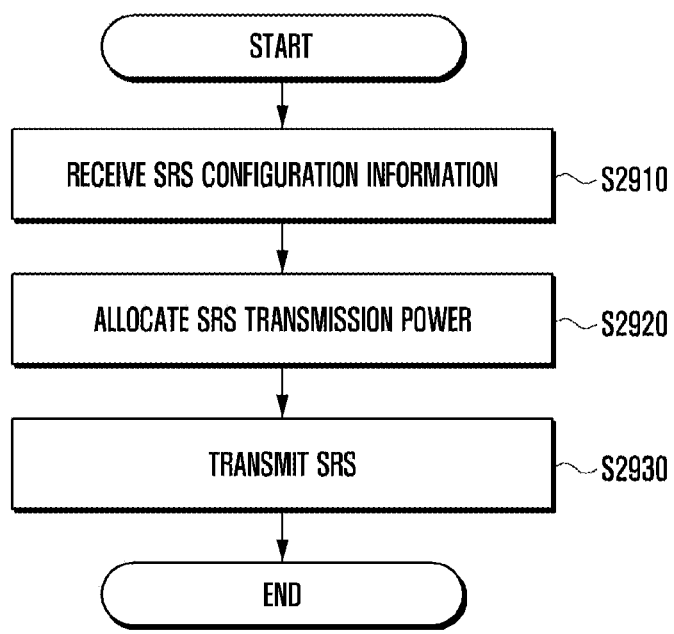
FIG. 29 is a diagram showing the operating procedure of a UE according to a second method of the present disclosure.

FIG. 29 is a diagram showing the operating procedure of a UE according to a second method of the present disclosure.

Referring to FIG. 29, at step S2910, the UE may receive SRS configuration information from an eNB. The UE may receive the SRS configuration information through higher layer signaling (e.g., RRC signaling).

The SRS configuration information may include at least one of the aforementioned cell-specific SRS configuration information and UE-specific SRS configuration information. That is, the SRS configuration information may include at least one of period and offset information in which an SRS may be transmitted for each subframe within a radio frame and transmission period and offset information of an SRS within a subframe in which an SRS may be transmitted.

Furthermore, the SRS configuration information may include at least one of a maximum number of CCs in which an SRS may be transmitted and SRS drop-related configuration information.

The cell-specific SRS configuration information and the UE-specific SRS configuration information, and the maximum number of CCs in which an SRS may be transmitted and the SRS drop-related configuration information may be included in one message and transmitted or may be included two messages, respectively, and transmitted.

Thereafter, at step S2920, the UE may allocate transmission power to SRSs to be transmitted based on the aforementioned priority rule.

Thereafter, at step S2930, the UE may simultaneously transmit the corresponding SRSs. In this case, SRSs to which transmission power is not allocated due to the transmission power restriction of the UE may occur. Accordingly, as described above, the eNB may not perform channel estimation on a predetermined number of SRSs, thus being capable of solving a problem in that channel estimation is performed using an SRS to which transmission power is not allocated.

Meanwhile, in the detailed description of the present disclosure, the detailed embodiments have been described, but the present disclosure may be modified in various ways without departing from the scope of the present disclosure. Accordingly, the scope of the present disclosure should not be limited to the described embodiments and determined, but should be determined by the claims and equivalents thereof in addition to the claims to be described later. This may include a method of mixing and using the first method and the second method. Furthermore, in the aforementioned first method, a maximum number of SRSs which may be simultaneously transmitted may be applied based on the SRS drop criterion of a UE instead of a maximum number of CCs in which an SRS may be simultaneously transmitted.

Figure 30:
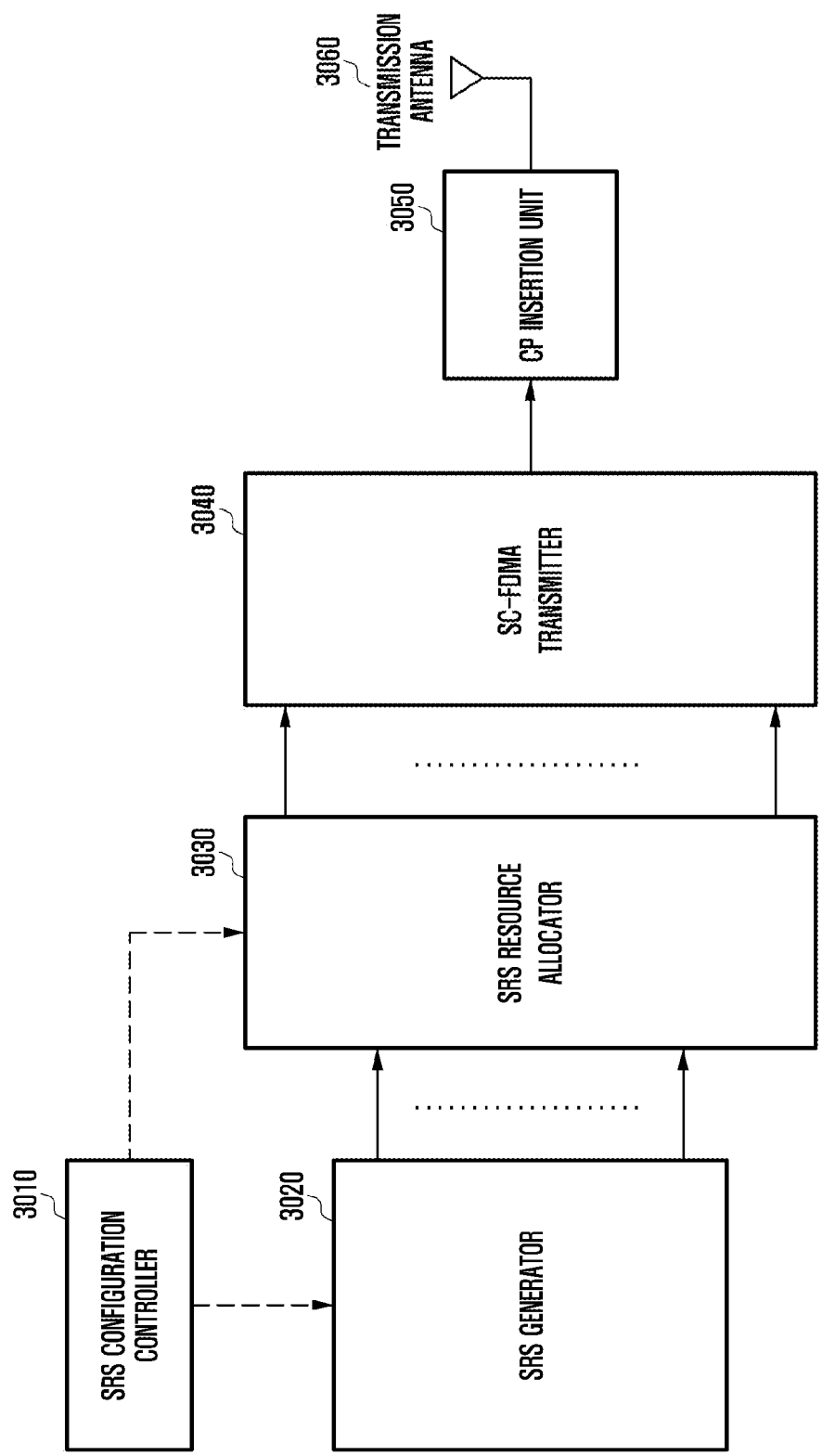
FIG. 30 is a diagram showing the configuration of a UE of the present disclosure.

FIG. 30 is a diagram showing the configuration of a UE of the present disclosure.

Referring to FIG. 30, the UE may include an SRS configuration controller 3010, an SRS generator 3020, an SRS resource allocator 3030, an SC-FDMA transmitter 3040, a cyclic prefix (CP) insertion unit 3050 and a transmission antenna 3060.

The SRS configuration controller 3010 may perform the aforementioned cell-specific configuration and UE-specific configuration of an SRS and the aforementioned configuration of a maximum number of SRS simultaneous transmission CCs from SRS configuration information received from an eNB. The pieces of configuration information may be received through high signaling.

Meanwhile, the SRS generator 3020 may generate a CAZAC sequence for configuring an SRS based on parameters set by the SRS configuration controller 3010. The parameters set by the SRS configuration controller 3010 may include a UE-specific SRS period and offset, frequency resource information of an SRS, an SRS bandwidth, a cyclic shift value, etc.

Furthermore, the SRS resource allocator 3030 may determine time and a frequency resource in which an SRS will be transmitted based on the aforementioned parameters.

Thereafter, an SRS is converted into a time domain through the SC-FDMA transmitter 3040. A cyclic prefix may be inserted into the SRS by the CP insertion unit 3050 and transmitted through the transmission antenna 3060.

In this case, although not shown in the drawing, the SRS configuration controller 3010, the SRS generator 3020, the SRS resource allocator 3030, the SC-FDMA transmitter 3040 and the cyclic prefix (CP) insertion unit 3050 may be included in the controller of the UE. Furthermore, the transmission antenna may be included in the transceiver of the UE.

In this case, the controller of the UE may receive the aforementioned configuration information through higher signaling by controlling the transceiver. Furthermore, the controller of the UE may generate an SRS based on received configuration information and transmit the generated SRS by controlling the SRS configuration controller, the SRS generator and the SRS resource allocator. That is, the controller of the UE may receive two or more types of configuration information from an eNB, may drop some SRSs based on a maximum number of CCs in which an SRS may be transmitted in the received configuration information, and may transmit only some SRSs. Detailed contents are the same as those described above and are omitted hereinafter.

Furthermore, the controller may control an overall operation of the UE.

Furthermore, the UE is not limited to the elements disclosed in this figure and may further include various elements depending on a function performed by the UE. For example, the UE may further include a display unit displaying the current state of the UE, an input unit to which a signal, such as the execution of a function, is input from a user, a memory storing data generated by the UE.

Figure 31:
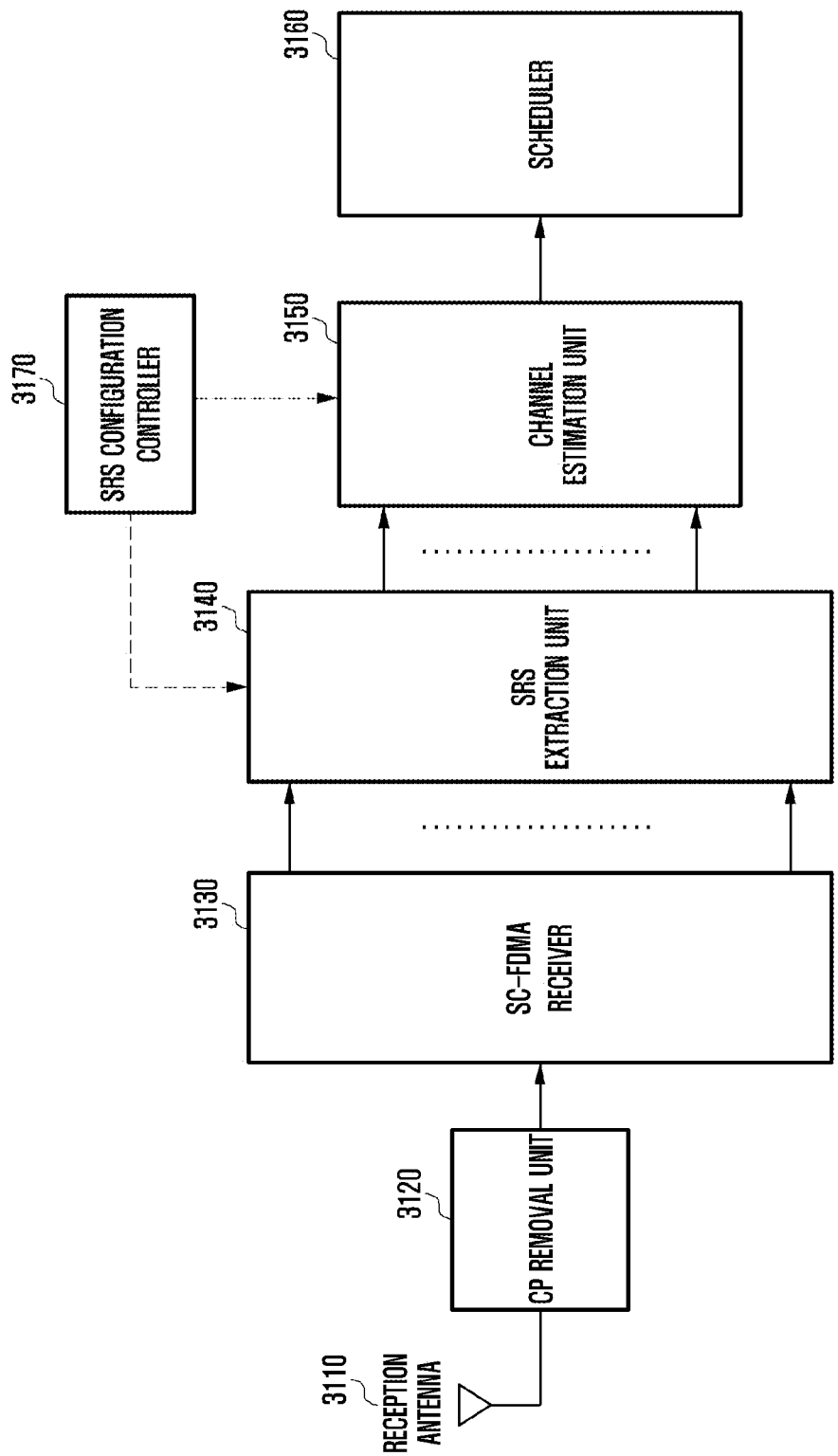
FIG. 31 is a diagram showing the configuration of an eNB of the present disclosure.

FIG. 31 is a diagram showing the configuration of an eNB of the present disclosure.

Referring to FIG. 31, the eNB may include a reception antenna 3110, a cyclic prefix (CP) removal unit 3120, an SC-FDMA receiver 3130, an SRS configuration controller 3170, a channel estimation unit 3150 and a scheduler 3160.

A cyclic prefix may be removed from an uplink signal, received by the reception antenna 3110, through the CP removal unit 3120. Thereafter, the uplink signal received by the SC-FDMA receiver 3130 may be converted into a frequency domain.

The SRS configuration controller 3170 may control the operations of an SRS extraction unit 3140 and the channel estimation unit 3150 based on SRS configuration information from the aforementioned eNB. That is, the SRS configuration controller 3170 may extract an SRS from the uplink signal using the aforementioned cell-specific SRS period and offset, frequency resource information of the SRS, SRS bandwidth and cyclic shift value, and may determine that channel estimation should be performed on which SRS based on the configuration of a maximum number of CCs in which an SRS may be simultaneously transmitted. Finally, the scheduler 3160 may perform the data scheduling and uplink control of a UE that has transmitted a corresponding SRS based on the estimation of the channel estimation unit 3150.

In this case, although not shown in the figure, the cyclic prefix (CP) removal unit 3120, the SC-FDMA receiver 3130, the SRS configuration controller 3170, the channel estimation unit 3150 and the scheduler 3160 may be included in the controller of the eNB. Furthermore, the reception antenna may be included in the transceiver of the eNB.

In this case, the controller of the eNB may transmit the aforementioned configuration information through higher signaling by controlling the transceiver. Furthermore, the controller of the eNB may receive an SRS by controlling the SRS extraction unit, the SRS configuration controller and the channel estimation unit. That is, the controller of the eNB may transmit two or more types of configuration information, and may receive only some SRS based on a maximum number of CCs in which an SRS may be transmitted in the transmitted configuration information. Accordingly, the controller may measure a channel state using the received SRS.

Alternatively, the controller may identify an SRS that belongs to received SRSs and on which channel measurement will be performed using configuration information or information previously stored in the eNB. Accordingly, the controller may measure a channel state using some of received SRSs, and detailed contents are the same as those described above and omitted hereinafter.

Furthermore, the controller may control an overall operation of the eNB.

Furthermore, the eNB is not limited to the elements disclosed in the figure and may further include various elements depending on a function performed by the eNB. For example, the eNB may further include a memory storing data generated by the eNB or data transmitted or received data by the eNB, etc.

Meanwhile, the preferred embodiments of the present disclosure have been disclosed in this specification and drawings, and specific terms are used therein, but they are used as common meanings in order to clarify the technological contents of the present disclosure and help understanding of the present disclosure, but are not intended to limit the scope of the present disclosure. It will be evident to those skilled in the art that various implementations based on the technological spirit of the present disclosure are possible in addition to the disclosed embodiments.

The invention claimed is:
1. A method of a terminal, the method comprising:
receiving, via higher layer signaling, configuration information including information indicating whether to use a demodulation reference signal (DMRS) table associated with an orthogonal cover code (OCC) length of 4;
receiving downlink control information including DMRS information;

identifying a number of layers, an antenna port, and a scrambling identity based on the DMRS information and a DMRS table that is determined based on the information; and receiving a DMRS based on the number of layers, the antenna port, and the scrambling identity, wherein the DMRS table associated with the OCC length of 4 includes the number of layers, an antenna port, and a scrambling identity that are associated with the OCC length of 4.

2. The method of claim 1, wherein a length of the DMRS information is 3 bits or 4 bits.

3. The method of claim 2, wherein the length of the DMRS information is determined based on the configuration information.

4. A method of a base station, the method comprising:

transmitting, via higher layer signaling, configuration information including information whether to use a demodulation reference signal (DMRS) table associated with an orthogonal cover code (OCC) length of 4;

transmitting downlink control information including DMRS information; and transmitting a DMRS based on a number of layers, an antenna port, and a scrambling identity corresponding to the DMRS information and a DMRS table that is determined based on the information, wherein the DMRS table associated with the OCC length of 4 includes a number of layers, an antenna port, and a scrambling parameter that are associated with the OCC length of 4.

5. The method of claim 4, wherein a length of the DMRS information is 3 bits or 4 bits.

6. The method of claim 4, wherein the length of the DMRS information is determined based on the information.

7. A terminal, the terminal comprising:

a transceiver; and a controller configured to:

receive, via the transceiver, configuration information including information indicating whether to use a demodulation reference signal (DMRS) table associated with an orthogonal cover code (OCC) length of 4, via higher layer signaling, receive, via the transceiver, downlink control information including DMRS information, identify a number of layers, an antenna port, and a scrambling identity based on the DMRS information and a DMRS table that is determined based on the information, and receive, via the transceiver, a DMRS based on the number of layers, the antenna port, and the scrambling identity, wherein the DMRS table associated with the OCC length of 4 includes a number of layers, an antenna port, and a scrambling identity that are associated with the OCC length of 4.

8. The terminal of claim 7, wherein a length of the DMRS information is 3 bits or 4 bits.

9. The terminal of claim 8, wherein the length of the DMRS information is determined based on the information.

10. A base station, the base station comprising:

a transceiver; and a controller configured to:

transmit, via the transceiver, configuration information including information indicating whether to use a demodulation reference signal (DMRS) table associated with an orthogonal cover code (OCC) length of 4 via higher layer signaling, transmit, via the transceiver, downlink control information including DMRS information; and transmit, via the transceiver, a DMRS based on a number of layers, an antenna port, and a scrambling identity corresponding to the DMRS information and a DMRS table that is determined based on the information, wherein the DMRS table associated with the OCC length of 4 includes a number of layers, an antenna port, and a scrambling identity that are associated with the OCC length of 4.

11. The base station of claim 10, wherein a length of the DMRS information is 3 bits or 4 bits.

12. The base station of claim 11, wherein the length of the DMRS information is determined based on the information.

* * * * *